United States Patent
Sanders et al.

[11] Patent Number: 5,923,424
[45] Date of Patent: Jul. 13, 1999

[54] FIBER OPTIC GYROSCOPE VIBRATION ERROR COMPENSATOR

[75] Inventors: Glen A. Sanders, Scottsdale; Rudolf C. Dankwort; Andrew W. Kaliszek, both of Phoenix; Clarence E. Laskoskie, Scottsdale, all of Ariz.; Lee K. Strandjord, Tonka Bay, Minn.; Daniel L. Sugarbaker, Ada; Jerry L. Page, Alto, both of Mich.

[73] Assignee: Honeywell Inc., Minneapolis, Minn.

[21] Appl. No.: 08/879,902

[22] Filed: Jun. 19, 1997

[51] Int. Cl.⁶ ..................................... G01C 19/72
[52] U.S. Cl. .............................................. 356/350
[58] Field of Search ............................ 356/350, 345

[56] References Cited

FOREIGN PATENT DOCUMENTS

| | | |
|---|---|---|
| 0569993 | 11/1993 | European Pat. Off. . |
| 0694760 | 1/1996 | European Pat. Off. . |
| 3115811 U | 12/1991 | Japan . |
| 5187878 | 7/1993 | Japan . |
| 5340760 | 12/1993 | Japan . |
| 9514907 | 6/1995 | WIPO . |

Primary Examiner—Samuel A. Turner
Attorney, Agent, or Firm—John G. Shudy, Jr.

[57] ABSTRACT

A rectification error reducer for a fiber optic gyroscope, which is an intensity servo or compensator for reducing vibration effects in the optical signals caused by modulation at vibration frequencies induced by the gyroscope operating environment. The vibration effects may be detected in signals from the photodiode output in amplitude form which is used in a control system to null out optical intensity variations at the frequencies of vibration.

36 Claims, 20 Drawing Sheets

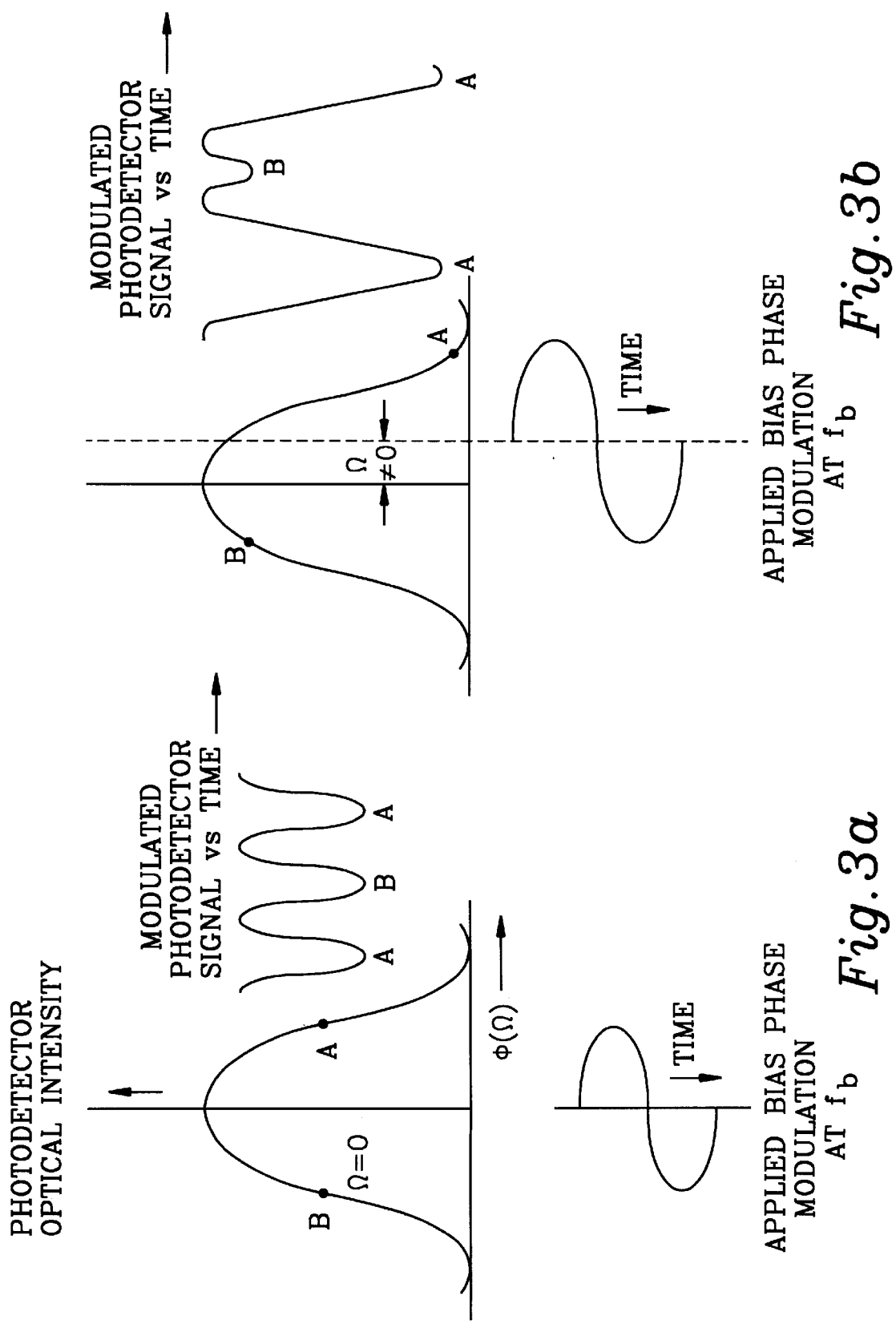

MODULATED PHOTODETECTOR OUTPUT

TIME

SAMPLED SYSTEM
$A_i, B_i$ ARE DIGITAL NUMBERS $$\sum_i (A_i - B_i) = \text{CONST} \cdot \Omega$$

FIBER OPTIC GYROSCOPE VIBRATION ERROR COMPENSATOR

BACKGROUND OF THE INVENTION

The present invention concerns fiber optic gyroscopes having vibration-error reduction schemes, and more particularly alleviating false indications of rotation rate due to rectification of vibration at vibration frequencies in the gyroscope operating environment.

Fiber optic gyroscopes are an attractive means with which to sense rotation of an object supporting such a gyroscope. Such gyroscopes can be made quite small and can be constructed to withstand considerable mechanical shock, temperature change, and other environmental extremes. Due to the absence of moving parts, they can be nearly maintenance free, and they have the potential of becoming economical in cost. They can also be sensitive to low rotation rates that can be a problem in other kinds of optical gyroscopes.

A fiber optic gyroscope, as shown in FIG. 1, has a coiled optical fiber wound on a core and about the axis thereof around which rotation is to be sensed. The optical fiber is typical of a length of 50 to 2,000 meters, or so, and is part of a closed optical path in which an electromagnetic wave, or light wave, is introduced and split into a pair of such waves to propagate in clockwise (cw) and counterclockwise (ccw) directions through the coil to both ultimately impinge on a photodetector. Rotation $\Omega$ about the sensing axis of the core, or the coiled optical fiber, provides an effective optical path length increase in one rotational direction and an optical path length decrease in the other rotational direction for one of these waves. The opposite result occurs for rotation in the other direction. Such path length differences between the waves introduce a phase shift between these waves for either rotation direction, i.e., the well-known Sagnac effect. This gyroscope is known as the interferometric fiber optic gyro (IFOG). The use of a coiled optical fiber is desirable because the amount of phase difference shift due to rotation, and so the output signal, depends on the length of the entire optical path through the coil traversed by the two electromagnetic waves traveling in opposed direction, and so a large phase difference can be obtained in the long optical fiber but in the relatively small volume taken by it as a result of being coiled.

The output light intensity impinging on the photodetector and hence the current emanating from the photodetector system photodiode (PD), in response to the opposite direction traveling electromagnetic waves impinging thereon after passing through the coiled optical fiber, follows a raised cosine function. That is, the output current depends on the cosine of the phase difference $\phi$ ($\Omega$) between these two waves as shown in FIG. 2. Since a cosine function is an even function, such an output function gives no indication as to the relative directions of the phase difference shift, and so no indication as to the direction of the rotation about the coil axis. In addition, the rate of change of a cosine function near zero phase is very small, and so such an output function provides very low sensitivity for low rotation rates.

Because of these unsatisfactory characteristics, the phase difference between the two opposite direction traveling electromagnetic waves is usually modulated by placing an optical phase modulator, or what is sometimes referred to as a bias modulator, in the optical path on one side of or adjacent to one side of the coiled optical fiber. In order to achieve sensitive detection of rotation, the Sagnac interferometer is typically biased at a frequency $f_b$ by a sinusoidal or square wave modulation of the differential phase between the counter-propagating beams within the interferometric loop. As a result, one of these oppositely directed propagating waves passes through the modulator on the way into the coil while the other wave, traversing the coil in the opposite direction, passes through the modulator upon exiting the coil.

In addition, a phase-sensitive detector PSD serving as part of a demodulator system or a digital demodulator is provided to receive a signal representing the photodetector output current. Both the phase modulator and the phase-sensitive detector can be operated by the modulation signal generator or a synchronized derivative thereof at the so-called "proper" frequency to reduce or eliminate modulator induced amplitude modulation.

FIGS. 3a, 3b and 4 show the effect of modulation and demodulation over the raised cosine function. In FIGS. 3a and 3b, the phase difference $\Delta\phi$ of the gyro optical waves are modulated with a sine wave bias modulation for the cases of $\Omega$=0 and $\Omega\neq$0 respectively. The resulting modulated intensity output of the photodetector vs time is shown to the right of the raised cosine function. As FIGS. 3a and 3b show, for $\Omega$=0 the phase modulation is applied symmetrically about the center of the raised cosine function and for $\Omega\neq$0 the phase modulation is applied asymmetrically. In the first case, the output is the same when the sensor is biased at point A as when it is biased at point B, giving only even harmonics of $f_b$ on the photodetector output. In the second case, the outputs at A and B are unequal, giving significant photodetector signal content at fb, which is indicative of rotation rate. This signal content at $f_b$, recovered by the phase sensitive demodulator (PSD), is proportional to the rotation rate $\Omega$. The signal also changes sign for an oppositely directed rotation rate.

FIGS. 4a and 4b show the case of square wave modulation for $\Omega$=0 and $\Omega\neq$0, respectively. Here, in practice, square wave modulation produces a modulation transients by the value of switching $\Delta\phi$ from point A to point B on the raised cosine function. These are shown by the vertical lines in the resultant modulated photodetector current vs. time, which is proportional to the optical intensity impinging on the photodetector for an ideal photodetector. Again, in the absence of rotation, the output at points A and B are equal, while the presence of rotation makes the output unequal for the "A" half periods and "B" half periods. In the square wave demodulation process depicted in FIGS. 5a, 5b and 5c, the signal component synchronous with the bias modulation frequency $f_b$ is recovered from the photodetector signal by multiplying by a square wave demodulator reference waveform of zero mean, synchronized to the bias modulation. The average, or DC component of the resultant demodulated output is proportional to rotation rate.

One other method of recovering the rotation rate, shown in FIG. 6, is that of a digital demodulation scheme where the output of the photodetector in a square wave modulated system is sampled at points $A_i$ during the first half cycle and points $B_i$ during the second half cycle. The sample event is represented by an arrow. Each sample is converted from an analog signal to a digital one and the difference between the digital sum of the $A_i$'s and the digital sum of the $B_i$'s is proportional to $\Omega$.

In all of these cases, the PSD/digital demodulator output is an odd function having a large rate of change at zero phase shift, and thus changes algebraic sign on either side of zero phase shift. Hence, the phase-sensitive detector PSD/digital demodulator signal can provide an indication of which direction a rotation is occurring about the axis of the coil, and can provide the large rate of change of signal value as a function of the rotation rate near a zero rotation rate, i.e. the detector has a high sensitivity for phase shifts near zero so that its output signal is quite sensitive to low rotation rates. This is possible, of course, only if phase shifts due to other sources, that is, errors, are sufficiently small. In addition, this output signal in these circumstances is close to being linear at relatively low rotation rates. Such characteristics for the output signal of the demodulator/PSD are a substantial improvement over the characteristics of the output current of the photodetector without optical phase modulation.

An example of such a system from the prior art is shown in FIG. 1. The optical portion of the system contains several features along the optical paths to assure that this system is reciprocal, i.e., that substantially identical optical paths occur for each of the opposite direction propagating electromagnetic waves except for the specific introductions of non-reciprocal phase difference shifts, as will be described below. The coiled optical fiber forms a coil 10 about a core or spool using a single mode optical fiber wrapped about the axis around which rotation is to be sensed. The use of a single mode fiber allows the paths of the electromagnetic or light waves to be defined uniquely, and further allows the phase fronts of such a guided wave to also be defined uniquely. This greatly aids maintaining reciprocity.

In addition, the optical fiber can be so-called polarization-maintaining fiber in that a very significant birefringence is constructed in the fiber so that polarization fluctuations introduced by unavoidable mechanical stresses, by the Faraday effect in magnetic fields, or from other sources, which could lead to varying phase difference shifts between the counter-propagating waves, become relatively insignificant. Thus, either the high refractive index axis, i.e., the slower propagation axis, or the low index axis is chosen for propagating the electromagnetic waves depending on the other optical components in the system.

The electromagnetic waves which propagate in opposite directions through coil 10 are provided from an electromagnetic wave source, or light source 11, in FIG. 1. This source is a broadband light source, typically a semiconductor superluminescent diode or a rare earth doped fiber light source which provide electromagnetic waves, typically in the near-infrared part of the spectrum, over a range of typical wavelengths between 830 nanometers (nm) and 1550 nm. Source 11 must have a short coherence length for emitted light to reduce the phase shift difference errors between these waves due to Rayleigh and Fresnel scattering at scattering sites in coil 10. The broadband source also helps to reduce errors caused by the propagation of light in the wrong state of polarization.

Between light source 11 and fiber optic coil 10 there is shown an optical path arrangement in FIG. 1 formed by the extension of the ends of the optical fiber forming coil 10 to some optical coupling components which separate the overall optical path into several optical path portions. A portion of optical fiber is positioned against light source 11 at a point of optimum light emission therefrom, a point from which it extends to a first optical directional coupler 12 which may also be referred to as a optical light beam coupler or wave combiner and splitter.

Optical directional coupler 12 has light transmission media therein which extend between four ports, two on each end of that media, and which are shown on each end of coupler 12 in FIG. 1. One of these ports has the optical fiber extending from light source 11 positioned thereagainst. At the other port on the sense end of optical directional coupler 12 there is shown a further optical fiber positioned thereagainst which extends to be positioned against a photodiode 13 which is electrically connected to a photodetection system 14.

Photodiode 13 detects electromagnetic waves, or light waves, impinging thereon from the portion of the optical fiber positioned there against and provides a photo current in response to a signal component selection means 35. This photocurrent, as indicated above, in the case of two nearly coherent light waves impinging thereon, follows a raised cosine function in providing a photocurrent output which depends on the cosine of the phase difference between such a pair of substantially coherent light waves. This photodetector device will operate into a very low impedance to provide the photo current which is a linear function of the impinging radiation, and may typically be a p-i-n photodiode.

Optical directional coupler 12 has another optical fiber against a port at the other end thereof which extends to a polarizer 15. At the other port on that same side of coupler 12 there is a non-reflective termination arrangement 16, involving another portion of an optical fiber.

Optical directional coupler 12, in receiving electromagnetic waves, or light, at any port thereof, transmits such light so that approximately half thereof appears at each of the two ports of coupler 12 on the end thereof opposite that end having the incoming port. On the other hand, no such waves or light is transmitted to the port which is on the same end of coupler 12 as is the incoming light port.

Polarizer 15 is used because, even in a single spatial mode fiber, light can propagate in two polarization modes through the fiber. Thus, polarizer 15 is provided for the purpose of passing light propagating of one polarization such that clockwise (cw) and counterclockwise (ccw) waves of the same polarization are introduced into sensing loop 10 and only light from the sensing loop of the same polarization for the cw and ccw waves are interfered at the detector. Polarizer 15, however, does not entirely block light in the one state of polarization that it is intended to block. Again, this leads to a small non-reciprocity between two opposite direction traveling electromagnetic waves passing therethrough and so a small non-reciprocal phase shift difference occurs between them which can vary with the conditions of the environment in which polarizer 15 is placed. In this regard, the high birefringence in the optical fiber used or the broad bandwidth of the light source used again aids in reducing this resulting phase difference, as indicated above.

Polarizer 15 has a port on either end thereof with the electromagnetic wave transmission medium contained therein positioned therebetween. Positioned against the port on the end thereof opposite that connected to optical directional coupler 12 is another optical fiber portion which extends to a further optical bidirectional coupler 17 which has the same wave transmission properties as does coupler 12.

The port on the same end of coupler 17 from which a port is coupled to polarizer 15 again is connected to a non-reflective termination arrangement 18, using a further optical fiber portion. Considering the ports on the other end of coupler 17, one is connected to further optical components in the optical path portions extending thereto from one end of the optical fiber in coil 10. The other port in coupler 17 is directly coupled to the remaining end of optical fiber 10. Between coil 10 and coupler 17, on the side of coil 10 opposite the directly connected side thereof, is provided an optical phase modulator 19. Optical phase modulator 19 has two ports on either end of the transmission media contained therein shown on the opposite ends thereof in FIG. 1. The optical fiber from coil 10 is positioned against a port of modulator 19. The optical fiber extending from coupler 17 is positioned against the other port of modulator 19.

Optical modulator 19 is capable of receiving electrical signals to cause it to introduce a phase difference in electromagnetic waves transmitted therethrough by either changing the index of refraction or the physical length of the transmission medium, therein to thereby change the optical path length. Such electrical signals are supplied to modulator 19 by a bias modulation signal generator 20 providing either a sinusoidal voltage output signal at a modulation frequency $f_b$ that is intended to be equal to $C_1 \sin(\omega_b t)$ where $\omega_b$ is the radian frequency equivalent of the modulation frequency $f_b$, or a square wave modulation signal at $f_b$. and $C_1$ is the amplitude of the modulation. Other suitable periodic waveforms could alternatively be used.

This completes the description of the optical portion of the system of FIG. 1 formed along the optical path followed by the electromagnetic waves, or light waves, emitted by source 11. Such electromagnetic waves are coupled from that source 11 through the optical fiber portion to optical directional coupler 12. Some of such wave entering coupler 12 from source 11 is lost in non-reflecting terminating arrangement 16 coupled to a port on the opposite end thereof, but the rest of that wave is transmitted through polarizer 15 to optical directional coupler 17.

Coupler 17 serves as a beam-splitting apparatus in which electromagnetic waves entering the port thereof, received from polarizer 15, split approximately in half with one portion thereof passing out of each of the two ports on the opposite ends thereof. Out of one port on the opposite end of coupler 17 an electromagnetic wave passes through optical fiber coil 10, modulator 19, and back to coupler 17. There, a portion of this returning wave is lost in non-reflective arrangement 18 connected to the other port on the polarizer 15 connection end of coupler 17, but the rest of that wave passes through the other port of coupler 17 to polarizer 15 and to coupler 12 where a portion of it is transmitted to photodiode 13. The other part of the wave passed from polarizer 15 to coil 10 leaves the other port on the coil 10 end of coupler 17, passes through modulator 19, and optical fiber coil 10 to re-enter coupler 17 and, again, with a portion thereof following the same path as the other portion to finally impinge on photodiode 13.

As indicated above, photodiode 13 provides an output photocurrent i proportional to the intensity of the two electromagnetic waves or light waves impinging thereon, and is therefore expected to follow the cosine of the phase difference between these two waves impinging on that diode. For sinusoidal bias modulation, the photodiode signal is given by the following equation:

$$i = \frac{I_o}{2}\eta[1 + \cos(\phi_R + \phi_b \cos\omega_b t)] \qquad (1)$$

where $I_o$ is the light intensity magnitude at photodetector 13 in the absence of any phase difference between counterclockwise waves and $\eta$ is the detector responsivity coefficient. This is because the current depends on the resulting optical intensity of the two substantially coherent waves incident on photodiode 13, an intensity which will vary from a peak value of $I_o$ to a smaller value depending on how much constructive or destructive interference occurs between the two waves. This interference of waves will change with rotation of the coiled optical fiber forming coil 10 about its axis as such rotation introduces a phase difference shift of $\phi_R$ between the waves. Further, there is an additional variable phase shift introduced in this photodiode output current by modulator 19 with an amplitude value of $\phi_b$ and which is intended to vary as $\cos(\omega_b t)$.

For the case of square wave modulation, the photodiode current is represented by $$i = \frac{1}{2}\eta I_o[1 + \cos(\phi_R + \phi_b) \qquad (2)$$

where the amplitude of the phase difference modulation is $$\phi_b = \begin{cases} |\phi_b| & nT \le t < \left(n + \frac{1}{2}\right)T \\ -|\phi_b| & \left(n + \frac{1}{2}\right)T \le t < (n+1)T \end{cases} \qquad (3)$$

where n=0, 1, 2, 3 . . . , and where T is the bias modulation period. Optical phase modulator 19 is of the kind described above and is used in conjunction with a PSD or digital demodulator 23 as part of an overall detection system for converting the output signal of photodetection system 14, following a cosine function as indicated above, to a signal function that provides in that output signal, as indicated above, information both as to the rate of rotation and the direction of that rotation about the axis of coil 10.

Thus, the output signal from photodetection system 14, including photodiode 13, is converted to a voltage and provided through an amplifier 21, where it is amplified and passed to PSD/digital demodulator means 23. Photodetection system 14, amplifier 21, filter 22 and PSD/digital demodulator 23 constitute signal component selection means 35. PSD/digital demodulator 23, serving as part of a phase demodulation system, is a well known device. Such a PSD/digital demodulator 23 extracts the amplitude of the fundamental frequency $f_b$ of the photodiode 13 output signal, or the fundamental frequency of modulation signal generator 20 plus higher odd harmonics, to provide an indication of the relative phase of the electromagnetic waves impinging on photodiode 13. This information is provided by PSD/digital demodulator 23.

Bias modulator signal generator 20, in modulating the light in the optical path at the frequency $f_b$ described above, also leads to harmonic components being generated by the recombined electromagnetic waves in photodetection system 14.

In operation, the phase difference changes in the two opposite direction propagating electromagnetic waves passing through coil 10 in the optical path, because of rotation, will vary relatively slowly compared with the phase difference changes due to modulator 19. Any phase differences due to rotation, or the Sagnac effect, will merely shift the phase differences between the two electromagnetic waves. The amplitude of the modulation frequency component of the output signal of photodetection system 14, is expected to be set by the magnitude of this phase difference modified further only by the factors of a) the amplitude value of the phase modulation of these waves due to modulator 19 and generator 20, and b) a constant representing the various gains through the system. Then, the periodic effects of this sinusoidal modulation due to generator 20 and modulator 19 in this signal component are expected to be removed by demodulation in the system containing PSD/digital demodulator 23 leaving a demodulator system (detector) output signal depending on just the amplitude scaling factor thereof.

Thus, the voltage at the output of amplifier 21 will typically appear as:

$$V_{21-out} = \frac{1}{2} I_o \eta k \{1 + \cos[\varphi_R + \phi_b \cos(\omega_b t + \theta)]\} \quad (4)$$

for sine wave modulation. The constant k represents the gains through the system to the output of amplifier 21. The symbol θ represents additional phase delay in the output signal of amplifier 21 at $\omega_b$, with respect to the phase of the signal at $\omega_b$ on the photocurrent. This phase shift is thus introduced in photodetection system 14. The other symbols used in the preceding equation have the same meaning as they did in the first equation above.

The foregoing equation can be expanded in a Bessel series expansion to give the following:

$$V_{21-out} = \frac{1}{2} I_o \eta k \Big\{ [1 + J_0(\varphi_b)\cos\varphi_R] - 2J_1(\varphi_b)\sin\varphi_R \cos(\omega_b t + \theta) - \quad (5)$$

$$2J_2(\varphi_b)\cos\varphi_R \cos 2(\omega_b t + \theta) + 2J_3(\varphi_b)\sin\varphi_R \cos 3(\omega_b t + \theta) +$$

$$\sum_{n=2}^{\infty} [(-1)^n 2J_{2n}(\varphi_b)\cos\varphi_R \cos 2n(\omega_b t + \theta) -$$

$$(-1)^n 2k J_{2n+1}(\varphi_b)\sin\varphi_R \cos(2n+1)(\omega_b t + \theta)] \Big\}$$

This signal at the output of amplifier 21 is applied to the input of PSD 23, as is the signal from bias modulator generator 20, the latter again intended to be equal to $C_1 \sin(\omega_b t)$ where $\omega_b$ is the radian frequency equivalent of the modulation frequency $f_b$. Assuming that PSD 23 picks out only the signal of interest at $\omega^b$, the output of that detector with such a generator 20 output signal will then be the following:

$$V_{23-out} = I_o \eta k' J_1(\phi_b) \sin \phi_R \quad (6)$$

The constant k' accounts for the system gains from photodetector 13 output current through PSD/digital demodulator 23.

A similar result is obtained for square wave bias modulation where the photocurrent is $$i = \begin{cases} \frac{1}{2} I_o \eta [1 + \cos\phi_R \cos|\Delta\phi_b| - \sin\phi_R \sin|\Delta\phi_b|] & t_1 \leq t < t_2 \\ \frac{1}{2} I_o \eta [1 + \cos\phi_R \cos|\Delta\phi_b| + \sin\phi_R \sin|\Delta\phi_b|] & t_2 \leq t < t_3 \end{cases} \quad (7)$$

where
  $t_1 = nT$
  $t_2 = (n+\frac{1}{2}) T$
  $t_3 = (n+1) T$
and
  n=0, 1, 2, . . .
and the output of PSD 23 will be $$V_{23-out} = K'' I_o \eta \sin \phi_R \sin |\Delta\phi_b| \quad (8)$$

where K" is a constant of proportionality that includes the amplifier gains between the photodetector 14 current output and the PSD 23 output.

As can be seen from these equations, the output of PSD/digital demodulator 23 depends on the rotation rate.

However, there may be error terms that may prevent the device from achieving the expected results in the system of FIG. 1. One reason for failing to achieve the expected results is that bias modulation signal generator 20, in modulating the light in the optical path at frequency $f_b$ as described above through phase modulator 19, not only results in harmonic components being generated in photodetection system 14 by the recombined electromagnetic waves, but also directly supplies some harmonic components in the varying optical path phase because of nonlinearities occurring both in generator 20 and modulator 19.

That is, as a first possibility, the output signal supplied by modulation generator 20 at its output may contain not only a fundamental signal at frequency $f_b$, but also significant harmonics thereof. Even if a signal free of such harmonics could be provided, nonlinear component characteristics and hysteresis in phase modulator 19 can result in introducing such harmonics into the varying phase provided thereby in the optical path. Such harmonics can lead to significant rate bias errors in the output signal of the fiber optic gyroscope. Thus, there is desired an interferometric fiber optic gyroscope in which such errors due to the modulation system are reduced or eliminated.

The "proper" frequency is selected to be that frequency which results in the modulating of one of the waves 180 degrees out of phase with the modulation of the other. This modulation providing 180 degrees of phase difference between the two waves has the effect of eliminating modulator induced amplitude modulation of the resulting photodetector signal. The value of the "proper" frequency can be determined from the length of the optical fiber and the equivalent refractive index therefor.

The resulting signal output of PSD 23 follows a sine function, i.e. the output signal depends on the sine of the phase difference between the two electromagnetic waves impinging on the photodiode 13, primarily the phase shift due to rotation about the axis of the coil 10. A sine function is an odd function having its maximum rate of change at zero, and so changes algebraic sign on either side of zero. Hence, the phase sensitive demodulator signal can provide both an indication of which direction a rotation is occurring about the axis of coil 10, and can provide the maximum rate of change of signal value as a function of rotation rate near a zero rotation rate, i.e., has its maximum sensitivity near zero phase shifts, so that its output signal is quite sensitive to low rotation rates. This is possible, of course, only if phase shifts due to other sources, that is, errors, are made sufficiently small. In addition, this output signal in these circumstances is very close to being linear at relatively low rotation rates. Such characteristics for the output signal of the phase sensitive demodulator 23 are a substantial improvement over the characteristics of the output current of photodetector 14.

Nevertheless, the phase sensitive demodulator 23 output, in following a sine function, results in an output that at rotation rates further from zero, is less and less linear. The output does not become linear again until large enough rotation rates are encountered that give optical phase difference shifts of $\phi_R = \pm m\pi$, where m is an integer. In fact, the output of demodulator 23 is zero at $\phi_R = 0$ or $\phi_R = \pm m\pi$ and linear in regions close to these values. There is a strong desire to operate the gyroscope at a null, thereby gaining a gyro scale factor that is independent of the output signal size, gains of the electronics and having phase sensitive demodulator 23 stay within its linear operation region near its null condition.

This can be accomplished by adding a further phase modulator 19, or frequency shifter, near the end of the coil 10 in an optical path portion used by the opposite direction traveling electromagnetic waves propagating through the coiled optical fiber 10 to reach the photodetector 13. This phase modulator 19, or frequency shifter, is operated in a feedback loop from the photodetector system 14, i.e., the so-called rate loop, and provides sufficient negative feedback such that phase modulator 19 introduced phase change $\phi_f$ is just enough to cancel the phase shift difference between the opposite traveling direction electromagnetic waves resulting from a rotation about the axis of the coiled optical fiber 10 or enough such that $\phi_f = -\phi_R \pm m\pi$.

The resultant photodetector 13 current in such a closed loop system can now be represented as $$i = \frac{I_o \eta}{2} [1 + \cos(\phi_R + \phi_f + \phi_b \cos\omega_b t)] \qquad (9)$$

for the sine-wave modulated system, and hence if $\phi_f = -\phi_R m\pi$, then it can be shown that $V_{23-out} = 0$. Likewise, in the case of square wave demodulation $$i = \qquad (10)$$

$$\begin{cases} \frac{1}{2} I_o \eta [1 + \cos(\phi_R + \phi_f)\cos|\phi_b| - \sin(\phi_R + \phi_f)\sin|\phi_b|] & t_1 \le t < t_2 \\ \frac{1}{2} I_o \eta [1 + \cos(\phi_R + \phi_f)\cos|\phi_b| + \sin(\phi_R + \phi_f)\sin|\phi_b|] & t_2 \le t < t_3 \end{cases}$$

and $V_{23-out} = 0$
when the closed loop system adjusts of $\phi_f = -\phi_R \pm m\pi$.

As a result of the rate loop, there will be little net average phase shift $\phi_N = \phi_f + \phi_R$ from $0 \pm m\pi$ occurring at photodetector 13 except for transient rotation rate changes, and so little net average phase shift sensed by phase sensitive demodulator 23. Thus, the DC-averaged output signal of this phase sensitive demodulator 23 will always be near to, or at, zero. This is true, because the feedback gain of a typical servo loop is extremely high near frequencies close to zero. The signal from a generator 20 connected to phase sensitive demodulator 23 for operating this additional phase modulator 19, through providing a signal directing the modulator to provide a particular phase shift sufficient to cancel the phase shift due to rotation or make $\phi_f = -\phi_R \pm m\pi$ will thus contain within it or a related signal the information as to the magnitude and direction of the rotation rate and the value of m.

Several forms for the output signal from the generator 20 connected to phase sensitive demodulator 23 in the rate feedback loop have been suggested for operating this additional optical phase modulator 19. One common and good choice is to use a serrodyne generator which applies a sawtooth-like signal to optical phase modulator 19. A sawtooth or sawtooth-like signal is chosen because it can be shown that an ideal sawtooth signal of $2\pi$ phase amplitude provides what amounts to a pure frequency translation for the modulated electromagnetic waves, a single-sideband modulator. As a result, light passing through the phase modulator being operated with such a sawtooth signal will leave modulator 19 with its frequency translated by an amount equal to the frequency of the sawtooth signal. A non-ideal sawtooth signal won't result in pure frequency translation, there instead will be added harmonics generated which can be kept small by providing very nearly an ideal sawtooth waveform of $2\pi$ amplitude and by careful design of the modulator.

Another type of modulation waveform is called a dual ramp waveform that consists of a linear ramp of positive slope followed by a ramp of negative slope. In this case, the feedback loop alternately locks to $\phi_N = -\pi$ and $\phi_N = +\pi$ or more generally to $\phi_N = m\pi$ and $\phi_N = (m+2)\pi$. In the absence of rotation, the slope magnitudes of the up-ramp and the down-ramp are equal. In the presence of rotation, the slope magnitudes are different with the magnitude of the difference in slopes between the two ramps being proportional to the rotation rate magnitude. Which ramp, the up-ramp or the down-ramp, has the greater slope magnitude is an indication of rotational directions. This technique has the performance advantage that there is no fast fly-back required in the phase shifter voltage as is the case with the serrodyne waveform.

The following discussion will assume the use of serrodyne feedback modulation for the purposes of illustration, but dual ramp or other modulation schemes could be used as well. In addition, it is recognized that the bias modulation and the feedback ramp may be added together and applied to a single or multiple phase modulators.

Since optical phase modulator 19 so operated will be on one side of the coiled optical fiber 10, one of the electromagnetic waves will have its frequency translated upon entering coil 10 while the other will not have its frequency translated until it exits the coil. Hence, one wave traverses the loop having a higher frequency than the other (though both have the same frequency on reaching the photodetector) with the result that, for a fixed modulator (or serrodyne generator) frequency, one will have a phase shift with respect to the other at photodetector 13 in an amount set by the frequency of the sawtooth and the optical length of the fiber of $2\pi\tau\Delta f$. Here, $\Delta f$ is the modulator 20 or generator frequency, and $\tau$ is the transit time of the light waves through the coil. This phase shift will act to counter the phase shift between the light waves, caused by rotation, because of the negative feedback loop in which the modulator is provided. Thus, the frequency of the sawtooth, or sawtooth-like generator output signal will be an indication of the rotation rate, and the polarity of the sawtooth will indicate the direction of rotation.

One example of a rate feedback loop is shown in FIG. 7. Rather than to the rotation rate indicator of FIG. 1, the signal from phase sensitive detector 23 goes to servo electronics 24 which is incorporated in FIG. 7. In response to such phase difference, servo electronics 24 outputs a phase ramp signal 25 provided by a loop closure waveform generator 29 that supplies the phase ramp to modulator 19 in the form of signal 28 to phase-shift one beam relative to the other beam so as to bring the beams in phase with each other. A signal either from the servo electronics 24 or loop closure waveform generator 29 contains the magnitude and sign of the phase difference between optical waves. Summing amplifier 27 also supplies in signal 28 the bias modulation signal to this phase modulator 19. The feedback signal required to return beams into phase, such as the frequency of the sawtooth in the serrodyne modulation case, is an indication of the rate of rotation of sensing loop. In this closed loop case the modulator of choice is typically a phase modulator 19 on an integrated optic chip (IOC) 30 shown in FIG. 7 in order to accommodate the necessary high frequency content of the desired phase ramp signal which may be a sawtooth or a dual-ramp-type triangular wave. The signal 25, indicative of rotation, is then supplied to a rotation rate indicator 26 which provides a convenient and readily useful indication of rotation rate of loop. In the case of employing a phase modulator 19 on an integrated optical chip (IOC) 30 it is also convenient to implement coupler function 17 of FIG. 1 as a y-junction 31 on the IOC and to implement the polarizer 15 on the IOC chip or construct the IOC waveguides using a single polarization design. Y-junction 31 may be regarded as an optical lightwave or beam splitter/combiner, like that as of coupler 12.

In general, there may be reasons why the fiber optic gyro does not give the expected rotation sensing accuracy. One of these is due to the presence of vibration. There may be vibration-induced periodic stretching of the fiber or periodic strain in interferometer loop after the light is split into two waves to counterpropagate around the sensing coil 10 can cause a periodic phase difference modulation to the two light waves if the strain response to vibration is not equally applied to all fiber points located symmetrically in the sensing loop; that is, points located symmetrically from the center of the loop. This time varying phase difference shift $\delta$ at the vibration frequency $f_v$ of amplitude $\Delta\phi_v$ can be written as $$\delta = \Delta\phi_v \cos(\omega_v t + \epsilon) \quad (11)$$

where $\omega_v = 2\pi f_v$ and $\epsilon$ is an arbitrary phase. In this case, the error due to $\delta$ itself is a rapidly varying function with a zero mean, and averages to zero and does not cause a time-averaged error. As long as $\Delta\phi_v$ is small, this error in itself does not cause a large problem in most applications. Another cause of optical phase difference shift $\delta0$ at angular frequency $\omega_v$ due to vibration is that of a actual angular or torsional vibration which induces a true AC rotation rate. This effect takes the same functional form for a vibration-induced phase difference modulation $\delta = \Delta\phi_v \cos(\omega_v t + \epsilon)$ and the output of the gyro will correctly indicate the actual rotation rate environment by having its output suitably vary at $\omega_v$. Again, it must be noted that ideal gyro operation would indicate no DC or average rotation rate when the input rate was assumed to be an AC phenomena for this case. However, in either of the two above situations, the presence of other synchronously-induced vibration effects in the gyro, (in combination with the phase difference modulation $\delta$) may cause a rectified error with a non-zero average value which does appear falsely as an indication of steady state rotation rate. One such secondary effect is that of intensity modulation in the optical circuit caused by vibration. This may be due to the modulation of microbending losses in the fiber, both inside and outside the interferometer loop or to the light source 11 fiber pigtail. Another source of intensity modulation may be due to modulation of fiber stress points that convert light to the unwanted polarization state in the gyro path and this light will be eliminated by polarizer 15 before reaching the photodetector. The latter effect produces signal intensity modulation and may be caused by the modulation of polarization in source 11, in the source pigtail, in the IOC fiber pigtail to the IOC chip 30, or in coil 10. This effect may also be caused by modulating stresses inside the IOC 30 or coupler 17 or source 11 packages.

The optical intensity modulation in any of these cases can be represented by, $$I_o = I_a(1 + \alpha \sin[\omega_v t]) \quad (12)$$

where $I_a$ is the average intensity impinging on the photodiode 13 during vibration without bias modulation. Neglecting steady state or DC rotation rate to simplify the mathematical analysis, the error due to vibration can be derived by noting that the photodiode 13 output current for a sine wave bias modulation system is given by $$i = 1/2 I_o \eta (1 + \cos[\phi_b \cos(\omega_b t + \theta)(\delta + \phi_R)]) \quad (13)$$

The output of demodulator 23, which selects the signal component at $f_b$, can be shown to be $$V_{23-out} = \eta k' I_o J_1(\phi_b) \sin(\delta + \phi_R) \quad (14)$$

$$= \eta k' I_a(1 + \alpha \sin[\omega_v t]) J_1(\phi_b) \{ \sin[\Delta\phi_v \cos(\omega_v t + \epsilon)] + \sin\phi_R \} \quad (15)$$

where it was assumed that $\Delta\phi_v$ and $\phi_R$ are small so that $\cos[\Delta_v \cos(\omega_v t + \epsilon)] = 1$ and $\cos\phi_R = 1$. It can be shown that it can be simplified to $$V_{23-out} = \eta k' I_a J_1(\phi_b)\{-\alpha J_1(\Delta\phi_v)\sin\epsilon + 2J_1(\Delta\phi_v)\cos(\omega_v t + \epsilon) +$$
$$\alpha J_1(\Delta\phi_v)\sin(2\omega_v t + \epsilon) + \alpha J_3(\Delta\phi_v)\sin(2\omega_v t + \epsilon)\} +$$
$$\eta k' I_a J_1(\phi_b)\sin\phi_R[1 + \alpha\sin\omega_v t] \quad (16)$$

The approximation of $\Delta\phi_v \ll 1$ rad has been made and that we have dropped terms at higher frequencies than $2\omega_v t$. The first term in the above equation is a "DC" or rectified term that does not average to zero, giving a false indication of rotation rate. The other terms average to zero over a period long compared to $\omega_v^{-1}$. The rectified error or bias is a product of the intensity modulation of amplitude $\alpha$ and the phase difference modulation at $f_v$ of amplitude $\Delta\phi_v$. The rectified error vanishes when the intensity modulation and the phase modulation are 90° out of phase, i.e., $\epsilon = 0$ and is peaked when they are in phase, i.e., $\epsilon = 90°$. Note that in a typical gyroscope application device bandwidths of around a few hundred hertz are required. By merely low-pass filtering the output any terms in the kHz range may be attenuated. However the rectified error, due to vibration in the kHz or higher region, will not be removed and will cause errors.

Similarly, it can be shown that the same rectified bias occurs for the square wave bias-modulated system. Here, the photodiode signal is given by $$i = \frac{1}{2}\eta I_o(1 + \cos[\phi_b + \delta + \phi_R]) \quad (17)$$

Using a typical case of $|\phi_b| = \pi/2$ for simplicity, that is $$\phi_b = \begin{cases} \frac{\pi}{2} & nT \le t < \left(n + \frac{1}{2}\right)T \\ -\frac{\pi}{2} & \left(n + \frac{1}{2}\right)T \le t < (n+1)T \end{cases} \quad (18)$$

where n=0, 1, 2, 3 . . .
This gives a photodiode current signal of $$i(t) = \begin{cases} \frac{1}{2}\eta I_o(1 - \sin[\delta + \phi_R]) & nT \le t < \left(n + \frac{1}{2}\right)T \\ \frac{1}{2}\eta I_o(1 + \sin[\delta + \phi_R]) & \left(n + \frac{1}{2}\right)T \le t(n+1)T \end{cases} \quad (19)$$

The average output of the square wave demodulator will then be $$\langle V_{23-out}\rangle = \eta I_o k'' \sin[\delta + \phi_R] \quad (20)$$

where k" is a constant representing the gain of the electronics chain through the demodulator and the <> represents the time average of the signal over the bias modulation cycle. Substituting for the values of $I_o$ and $\delta$ gives $$\langle V_{23-out}\rangle = \eta k'' I_a(1 + \alpha \sin[\omega_v t])\{\sin[\Delta\phi_v \cos(\omega_v T + \epsilon)] + \sin\phi_R\} \quad (21)$$

where again $\phi_R$ and $\Delta\phi_v$ are assumed to be $\ll 1$. This gives the same result as the sinusoidal case if $J_1(\phi_b) \to 1$ and $k' \to k''$.

Reference one in the prior art does point out that this rectified error may be reduced in amplitude by the following means. The first method is to use a quadrupolar coil 10 winding pattern aimed at reducing $\Delta\phi_v$ by causing fiber segments inside the coils that are equidistant from the coil center to experience the same strain when vibrated. The second method is to reduce $\Delta\phi$ by impregnating coil 10 with varnish to prevent mechanical motion of the coil fibers under the influence of vibration. A third method is to improve the mechanical ruggedness of the source module, IOC 30 packaging and component packaging to attenuate intensity modulation resulting from fiber pigtail and fiber motion in a vibrational environment. The last is to enhance the rigidity of the mounting features in the gyro to reduce mechanical stress on optical components and subassemblies during vibration.

A rectification error reducer for a fiber optic gyroscope, which is a compensator for reducing vibration effects in the optical signals caused by modulation at vibration frequencies induced by the gyroscope operating environment. The vibration effects may be detected in signals from the photodiode output in amplitude form which is used in a control system to null out optical intensity variations at the frequencies of vibration.

BRIEF DESCRIPTION OF THE DRAWINGS

FIGS. 3a and 3b show the phase differences of the optical light waves and outputs of the gyroscope for zero and non-zero rotation rates, respectively.

DESCRIPTION OF THE EMBODIMENTS

Figure 1:
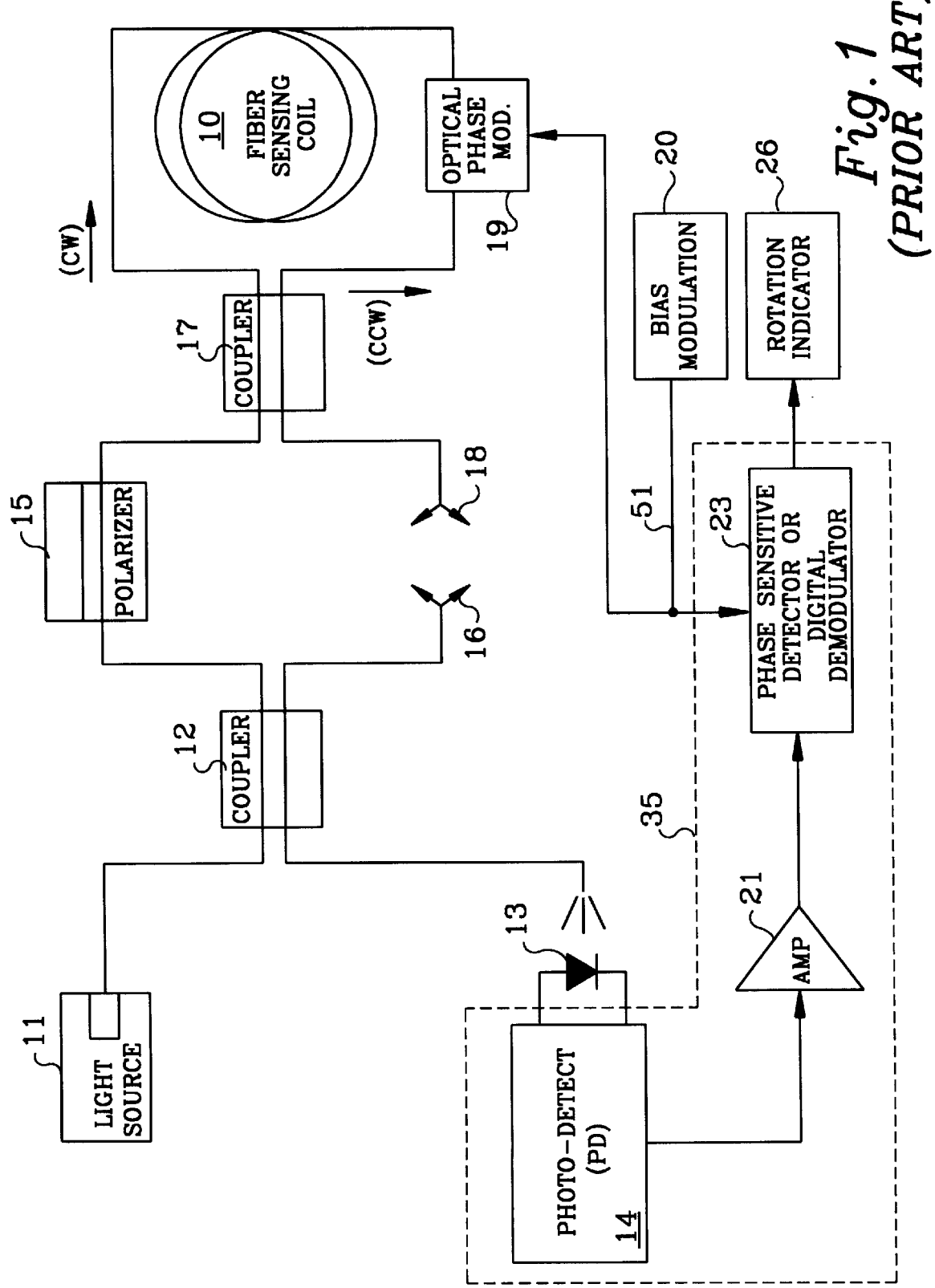
FIG. 1 shows a basic interferometric fiber optic gyroscope.
Figure 2:
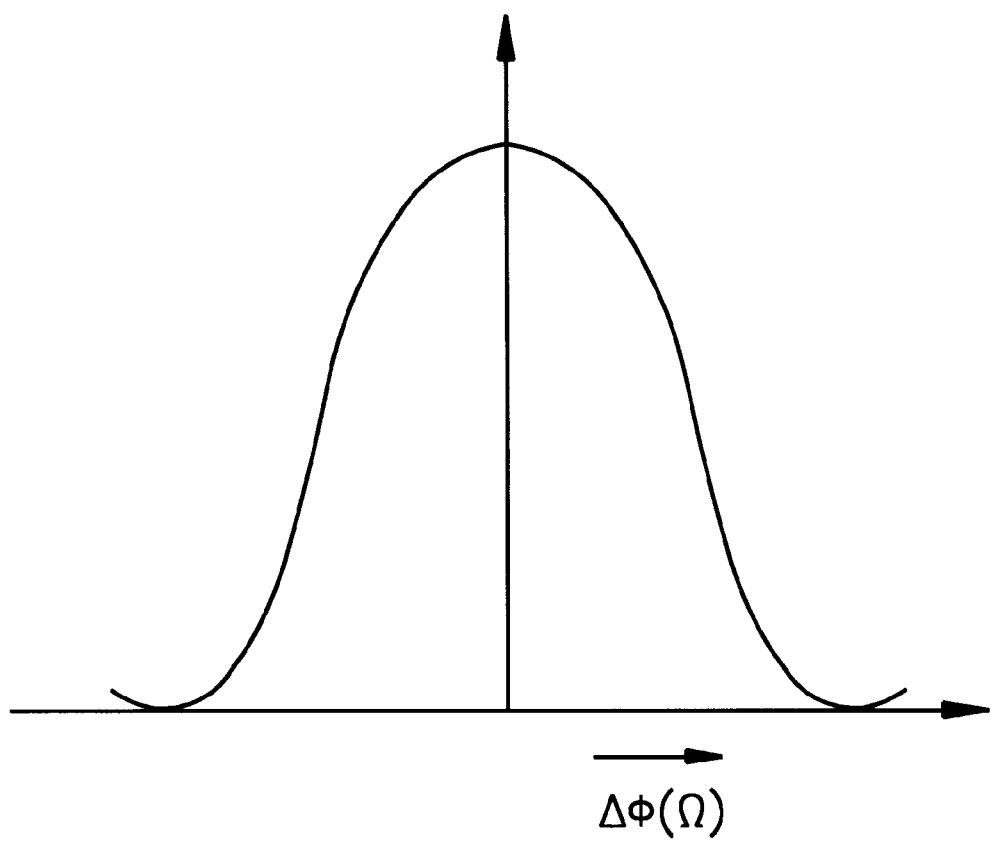
FIG. 2 is a graph of detected optical intensity or output current of a photodetector versus phase difference of counterpropagating light waves in the sensing coil of a fiber optic gyroscope.

The first part of this invention relates to attenuation of the rectified bias error primarily through reduction of the vibration induced intensity modulation. This can be effectively accomplished by sensing photodiode 13 signal in the range of expected vibration frequencies $f_v$, typically 5 Hz to 3 kHz. This provides an in-situ measurement of $\alpha$, the intensity modulation amplitude, which in turn may be used in a control system to null out intensity variations at $f_v$, which will be described or compensated for in the following description.

A key element of this scheme is the ability to independently observe the intensity modulation, $\alpha \sin \omega_v t$. It should be noted that the instantaneous intensity at photodiode 13, i.e., $$I=1/2I_o(1+\cos[\omega_b \cos \omega_b t+\delta+\phi_R]) \quad (22)$$

has already been analyzed for its spectral content at $\omega_b$, which is essentially measured in PSD/digital demodulator 23. This frequency content ranges typically from 25 kHz to 2 MHz for gyros operating at the proper frequency of a sensing coil of 4 km length to 50 m length, respectively. Important information, however, exists near baseband, i.e., the photodetector 13 signal content from 0 Hz to 3 kHz, the frequency range of the intensity modulation induced by vibration. This baseband signal content $I_L$ is given by, $$I_L=I_o[1+J_o(\phi_b) \cos(\delta+\phi_R)] \quad (23)$$

$$=I_a[1+\alpha \sin(\omega_v t)][1+J_o(\phi_b) \cos(\delta+\phi_R)] \quad (24)$$

for the sine wave modulated case.

Assuming $\delta+\phi_R$ is $<<1$, the $\cos(\delta+\phi_R)$ is approximately unity. Hence $I_L$ is a direct measure of the intensity of modulation in the optical circuit in the presence of vibration. This is also true in the square wave modulated case where (assuming $|\phi_b|=\pi/2$)

$$I_L = \frac{1}{2}I_o(1+\alpha\sin\omega_v t) \quad (25)$$

Figure 8:
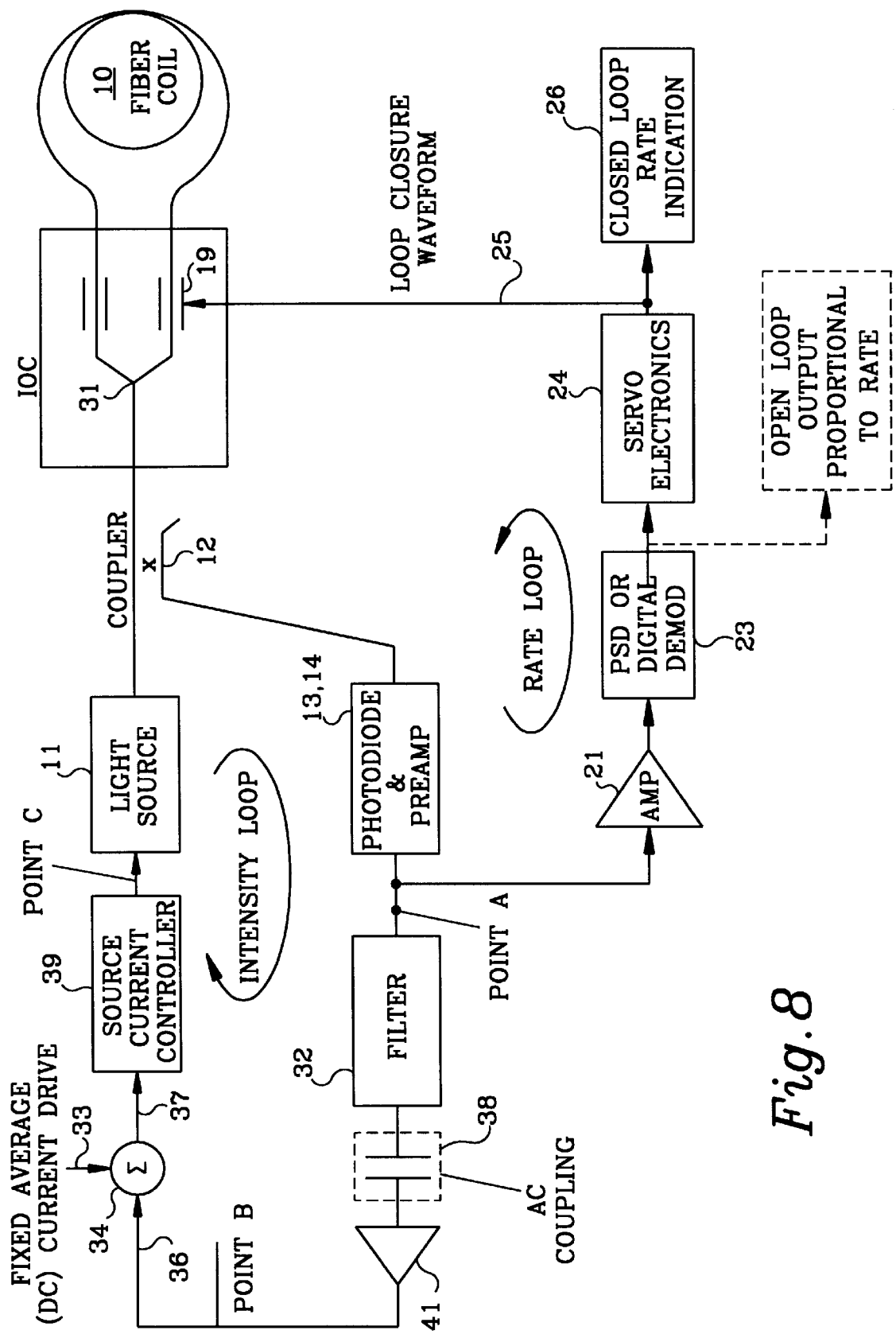
FIG. 8 is a schematic of a fiber optic gyroscope having an intensity servo loop to affect light source intensity to reduce vibration caused errors.
Figure 9:
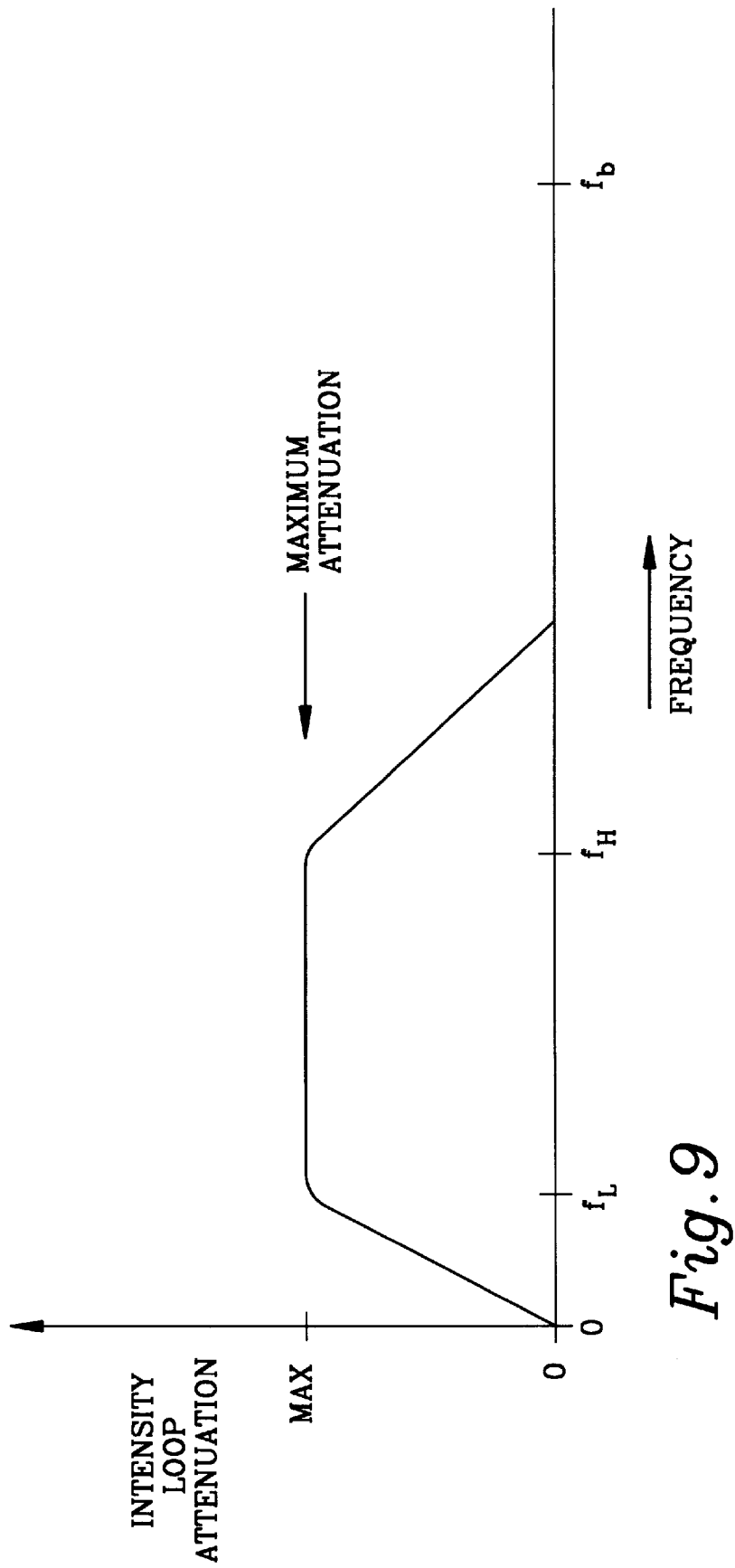
FIG. 9 reveals the upper and lower frequency ends of the vibration environment.

FIG. 8 shows a method of actively sensing $I_L$ and nulling the variation in $I_L$ to reduce $\alpha$, and thus reduce the rectified bias error. Here, again, rotation is sensed as described in the prior art either obtaining the open-loop output of PSD 23 for the rotation indication or using the output of PSD 23 to close the rate servo loop with a loop closure waveform in response to rotation. In either case, the baseband photodiode 13 signal $I_L$ is monitored by low-pass filtering 32 the photodiode output. Variations in the vibration frequency range can then be nulled out by producing an error signal proportional to $I_L$ and driving the light source 11 with a current at $\omega_v$ that produces intensity modulation via source current controller 39 in the source output equal and opposite to that observed at photodiode 13, thus nulling the net intensity modulation of $\omega_v$. A fixed current 33 is summed 34 in with the error signal 36 derived from the photodiode 13 to provide for a non-zero quiescent operating current 37 and intensity. One of the first such servo loops (from point A to point C on FIG. 8) is shown in FIG. 9. In this case, a super-luminescent diode (SLD) was used as light source 11 and its quiescent current was provided by the drive current reference. As is depicted in FIG. 8, it is typically important to limit the attenuation capability of the intensity servo, only nulling periodic intensity changes caused by vibration. That is, it is not desirable for the servo to change the long-term or DC average of the current since the average current affects the average source wavelength, which in turn, affects the average gyro scale factor. Hence it is not desirable to let the servo alter the time averaged current in response to slow variations in the average intensity at photodiode 13, such as those stemming from optical loss variations in the optical components over temperature and over time. Thus, it is most often desirable to implement a servo with AC coupling 38 via amplifier 41, as shown in the dashed area of FIG. 8, with source 11 having a fixed average input current.

The main consideration for the intensity servo is that the servo should have maximum power to attenuate in the vibration frequency $f_v$ range of interest, no ability to affect the average current and no ability to affect photodiode 13 signal in the frequency range of $f_b$ or higher. The latter is true since the rotation rate information is manifested in photodiode 13 signal at $f_b$ and higher odd harmonics of $f_b$. Thus, the optimum ability to attenuate signals as a function of frequency for the intensity loop is shown qualitatively in FIG. 9. The frequencies $f_H$ and $f_L$ represent the upper and lower frequency ends of the vibration environment. It may be desirable to tailor the attenuation between $f_H$ and $f_L$ to address a particular vibration environment rather than providing a flat response from $f_L$ to $f_H$ as shown in FIG. 9.

The primary benefit of the above solution is that the amplitude $\alpha$ of the intensity modulation at $\omega_v$ is reduced. Hence, the rectified bias (eqn or eqs) which depends on the product of $\alpha_e$ and the phase difference modulation $\delta$ at $\omega_v$ is reduced.

Figure 10:
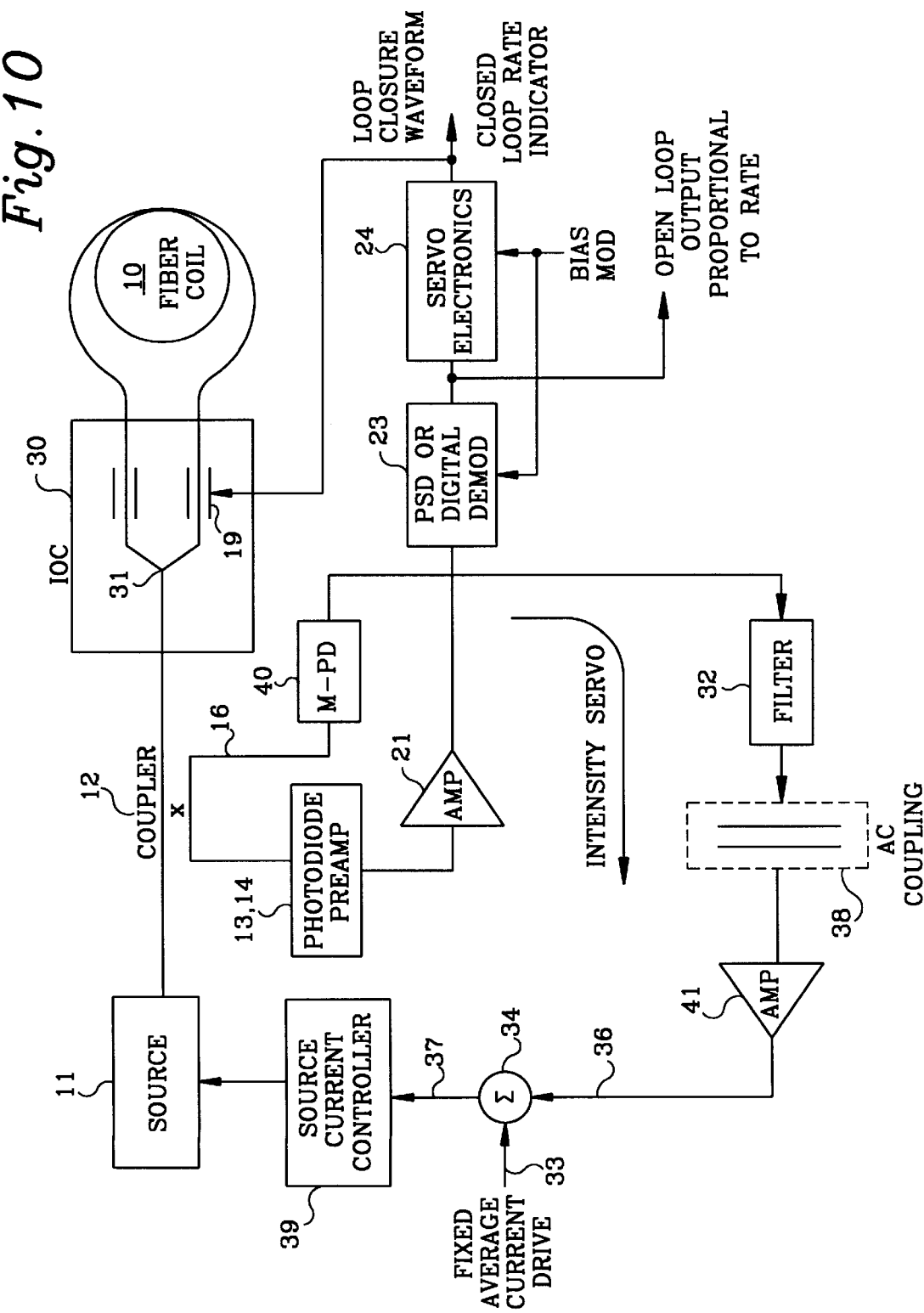
FIG. 10 is a schematic of another light source intensity servo loop for a fiber optic gyroscope.

It must be noted that if the preponderance of the intensity modulation is known to be generated in the light source 11 itself, then a simpler circuit design shown in FIG. 10 can be used. This assumes that the influence of vibration on the optical intensity throughput through all optical components is negligible except for that of light source 11 and its fiber pigtail. In this special case, a separate photodiode 13 may be used to monitor the output of light source 11 through unused port 16 of coupler 12. Variations in the sensed intensity are then nulled out by an intensity servo loop. The intensity servo loop responds to variations in monitor photodiode M-PD 40 signal at $f_v$ by driving source 11 with a current that generates an equal and opposite signal at M-PD 40. Thus vibration induced intensity variations in light source 11 are eliminated. In general, this special case (of source-only vibration sensitivity) is not satisfied and an intensity loop of the type seen in FIG. 8 is needed.

Figure 11:
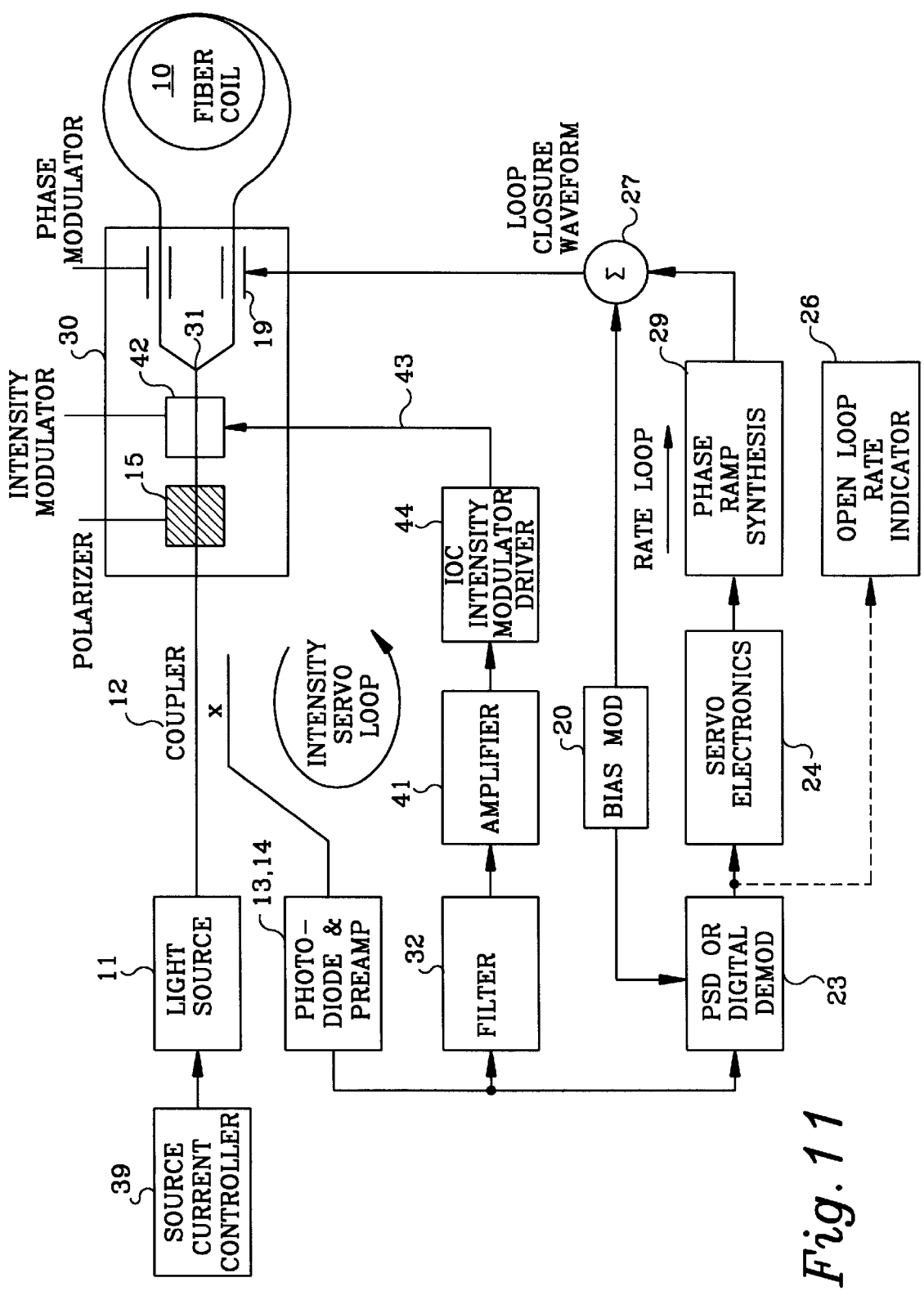
FIG. 11 is a schematic of a servo loop that affects intensity via a modulator to reduce vibration effects in a fiber optic gyroscope.
Figure 12:
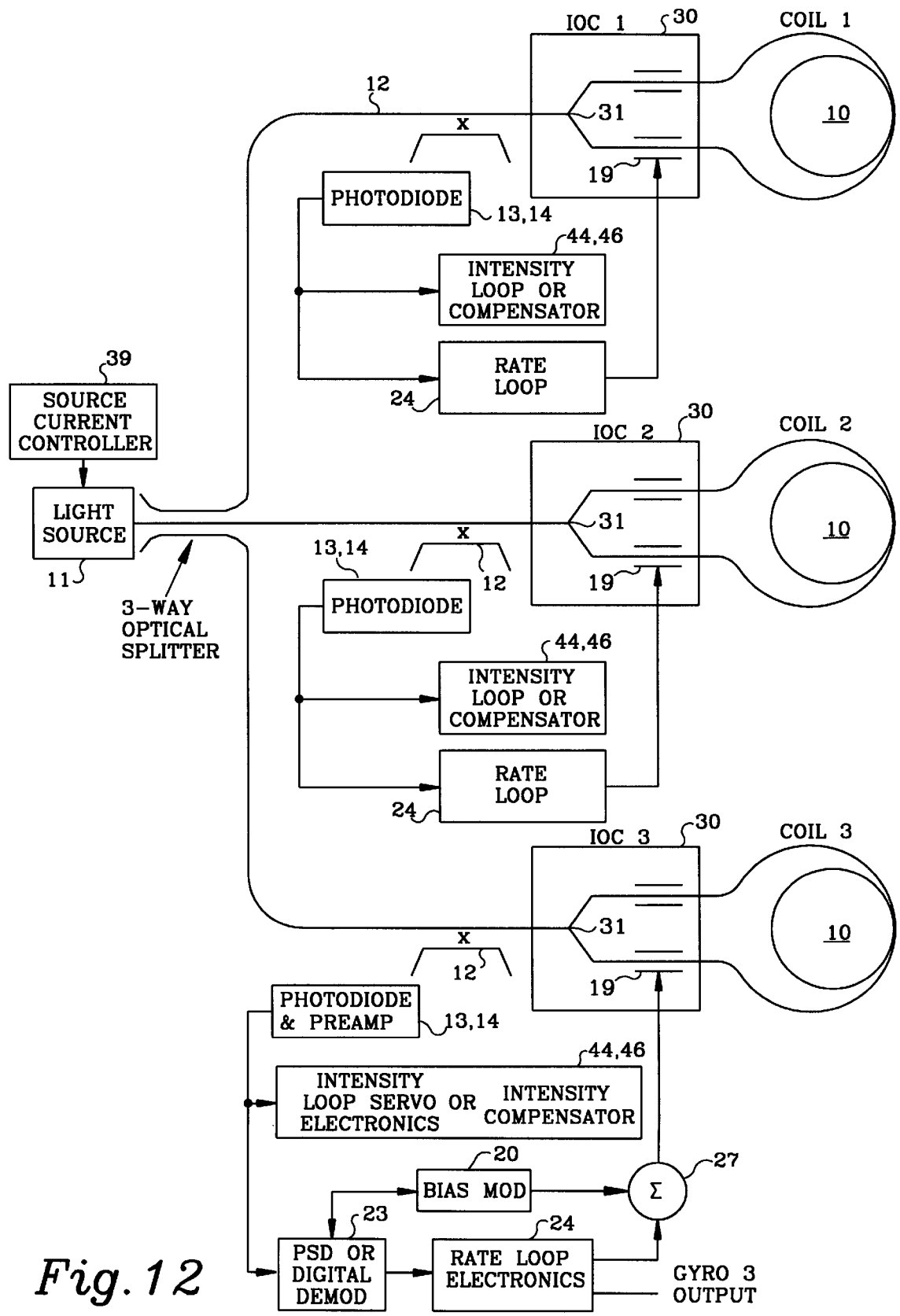
FIG. 12 reveals a multi-gyroscope configuration for incorporating various vibration rectification error reduction schemes.
Figure 13:
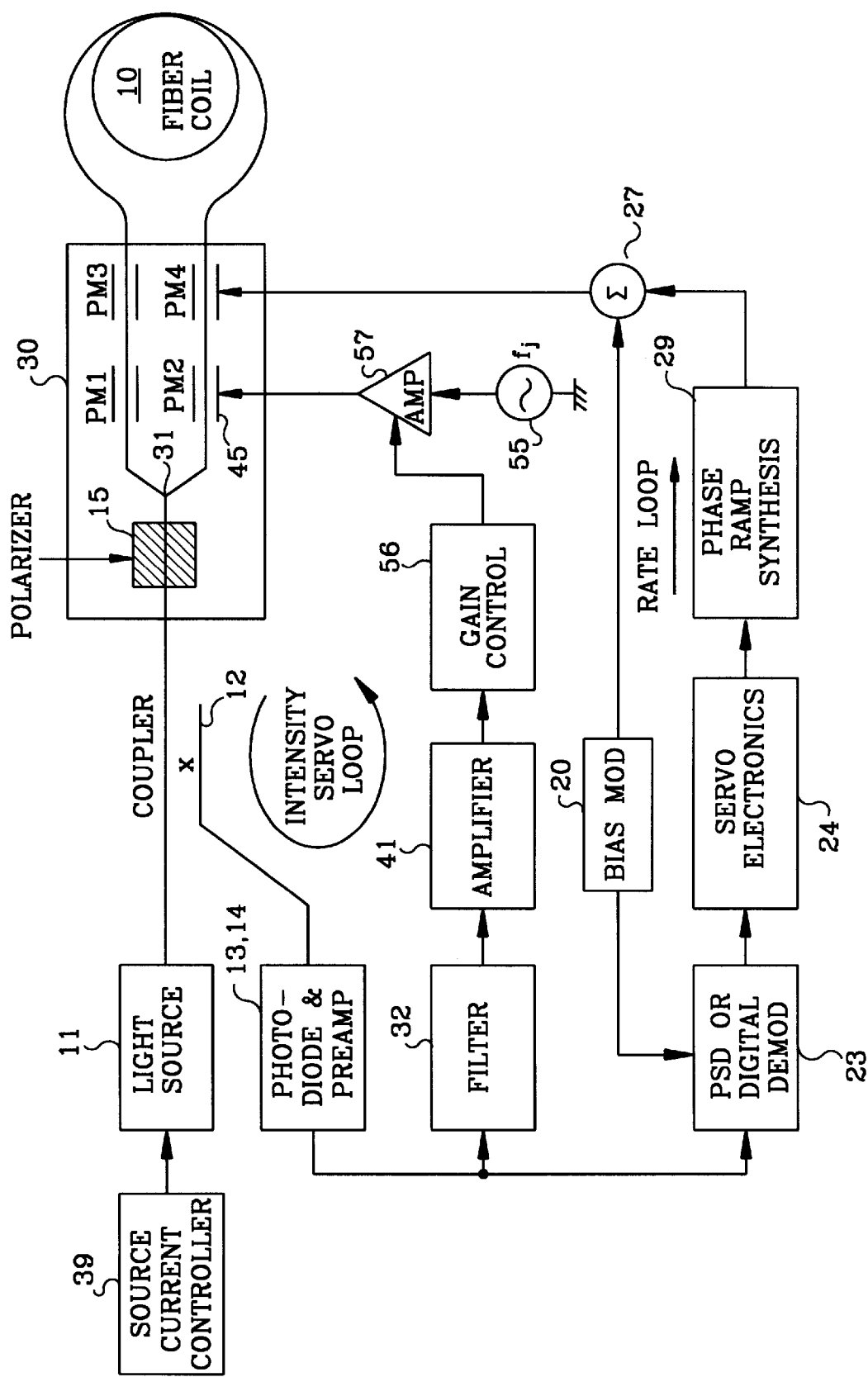
FIG. 13 is a schematic of a gyroscope having an intensity servo loop that effects vibration error reduction via a phase modulator.

There are several other important implementations of the FIG. 8 intensity servo that are more versatile and work in more universal situations. These are important improvement inventions. The first is shown in FIG. 11 where an intensity modulator 42 is employed on the input waveguide of IOC device 30. This device 42 may be a cutoff modulator that produces an intensity variation in response to an electrical signal input by virtue of varying the spatial mode size of a weakly-guided optical wave in the IOC 30 waveguide. The guided mode, when it expands, interacts with a metallic coating (for instance) which is placed near the waveguide to attenuate light, thereby changing the optical throughput in response to an electrical drive signal 43 from IOC intensity modulator driver 44. The attenuation through modulator 42 may be varied in response to vibration-induced changes of the intensity so as to stabilize the net intensity at photodetector 13. Thus vibration-induced intensity changes observed by photodetector 13 may be nulled out, so that the signal intensity at $f_v$ at photodiode 13 no longer varies. This implementation has the particular advantage that it can be used in arrangements where the gyro source is being shared between 2 or more gyros in a multi-axis system of the type shown in FIG. 12. These arrangements are particularly attractive because of the cost and electrical power savings resulting from the sharing of light sources 11 between gyros in a system. The intensity servo of type shown in FIG. 8 only works in a shared source system if the vibration induced optical intensity variations are common to all gyroscopes, i.e., light source 11 is the dominant cause of intensity modulation. The intensity servo arrangement of FIG. 12 allows each gyro that is sharing a common source 11 to separately compensate for its intensity variations irrespective of commonality with the other gyroscopes. Another intensity servo arrangement that provides this same benefit is shown in FIG. 13. In this scheme, only integrated optical phase modulators (which are typically more common than intensity modulators) are used. In this case, a phase modulator 45 on the output arm of the IOC device 30 is driven with an electrical drive signal at a frequency $f_j$, such as from generator 55, which is high compared to $f_v$ and $f_j \neq nf_b$. Since the phase modulation is occurring inside the interferometer loop much like the bias modulation, it can change the average intensity seen at photodiode 13. The larger phase modulation amplitude $A_j$, the lower the average intensity at the photodiode provided $A_j \leq \pi$ radians. Thus, by changing $A_j$ at $f_v$, a servo loop can adjust the intensity observed at photodiode 13 to null out vibration induced signal variations at $f_v$. The photodetector 14 signal goes through filter 32 to amplifier 41. The output of amplifier 41 goes to gain controller 56 which provides a signal to control the gain of amplifier 57

Figure 14:
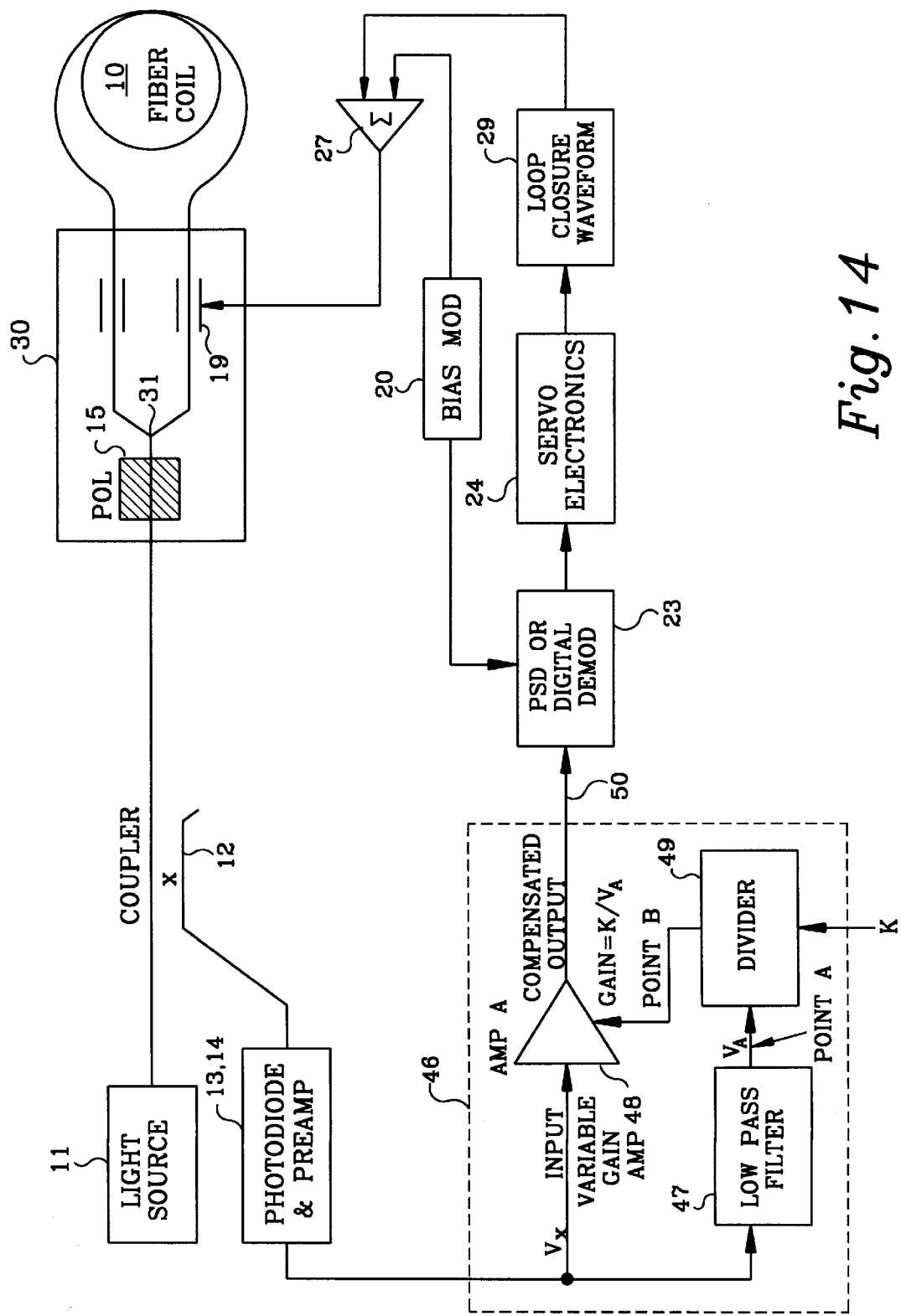
FIG. 14 shows a fiber optic gyroscope using an intensity compensation mechanism.

Another method that accomplishes an equivalent result is shown in FIG. 14. This embodiment employs a signal amplitude stabilization technique or "intensity compensator" 46 in the electrical signal path after photodiodes 13, 14 but before demodulator 23. It does not stabilize the photodiode signal at frequency $f_v$, but it does the equivalent function from the standpoint of vibration error rectification reduction, i.e., it normalizes the signal prior to the demodulation process. In this case, intensity changes at $f_v$ due to vibration are observed at signal photodiode 13. The variations of interest at the vibration frequency band of interest are separated out by a filtering process 47, amplifier 48 and fed forward to change the gain of the signal at the frequencies of interest. If the signal intensity at the photodiode falls because of vibration, the gain of amplifier 48 is increased to by an output of divider 49 to compensate for this variation. Likewise, it is decreased by the output of divider 49 to compensate for photodiode 13 signal increases. In this way the compensated signal 50 has no (or significantly reduced) variations at $f_v$ or in the range of possible values of $f_v$. The low pass filter 47 may be tailored to optimize signal variation attenuation versus frequency, obtaining the desired attenuation properties like those of FIG. 9. This method has some advantages in addition to being useful for cases where multiple gyros are sharing a common light source 11. These are:

1. It is an open loop intensity compensation technique. The filtering required to eliminate the gyro rate induced signals from the AM signals is not restrained by the typical closed loop stability requirements. Because gain and phase margin requirements do not exist, complex filtering can be applied without concern for how phase affects stability. This overcomes the inherent limitations on bandwidth and gain that a closed loop system imposes.

2. It applies the adjustment to the signal without a delay. The bandwidth of the compensation is controlled entirely by the local dedicated filters. In contrast, approaches which control the laser diode current using negative feedback are bandwidth limited by the fiber loop transit time and other signal processing delays.

3. For small intensity modulation levels the inverse characteristic can effectively be approximated by measuring the gain error, normalizing, negating, and adjusting the output gain. The circuit improvement is from point A to point B of FIG. 14. The circuit can be implemented in either digital or analog components with very high bandwidth. The scaling of the output gain sensitivity to the adjustment input can be tailored long term to compensate for temperature, life or other typical variations in the circuit. Intentional perturbations in the light source output could be introduced to allow continuous calibration of the circuit where extremely good performance is desired.

There is one more consideration for the intensity compensator arrangements of FIG. 14. These particular arrangements are unique in that a low pass filter 47 influences the primary photodetector 13 signal before it reaches PSD 23 or digital demodulator. In the ideal case, where bias modulation 20 is precisely tuned to the coil 10 proper frequency and the bias modulation waveform is perfect, the arrangement of FIG. 14 (with the characteristic of FIG. 9) will perform as to its greatest potential. In practice, however, operation of intensity compensator 46 may cause false indications of rotation when: a) the bias frequency does not match the proper frequency, and b) the modulation waveform has imperfections such as higher even harmonic content and distortion. This ultimately allows intensity compensator 46 to impart an unwanted gain variation at $f_b$ onto the gyro signal prior to demodulation.

Figure 15:
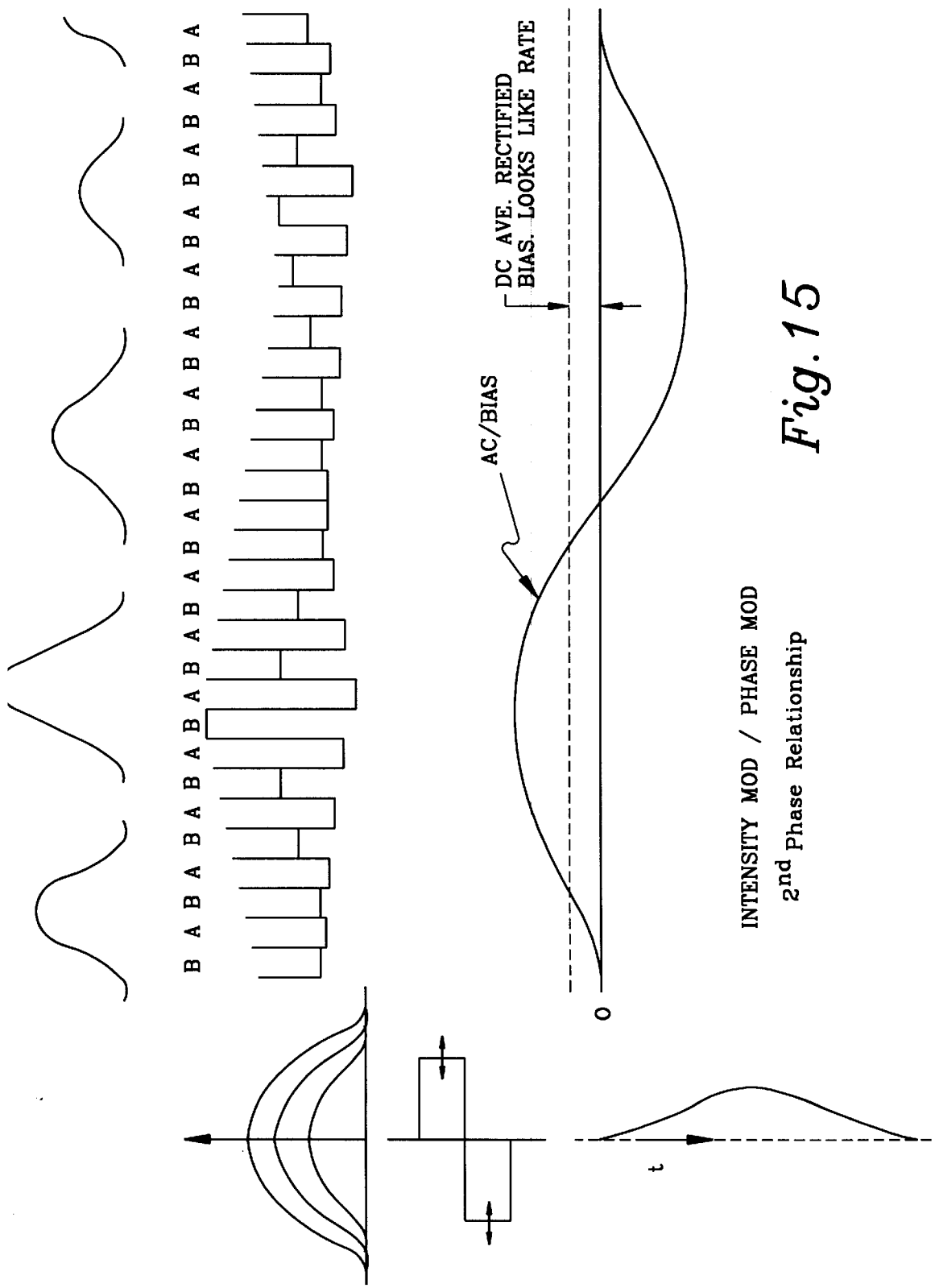
FIG. 15 shows a relationship of a low frequency vibration induced error on a gyroscope detector output.

FIG. 15 shows a relationship of a low frequency vibration induced error on a gyroscope detector output.

Figures 16A, 16B:
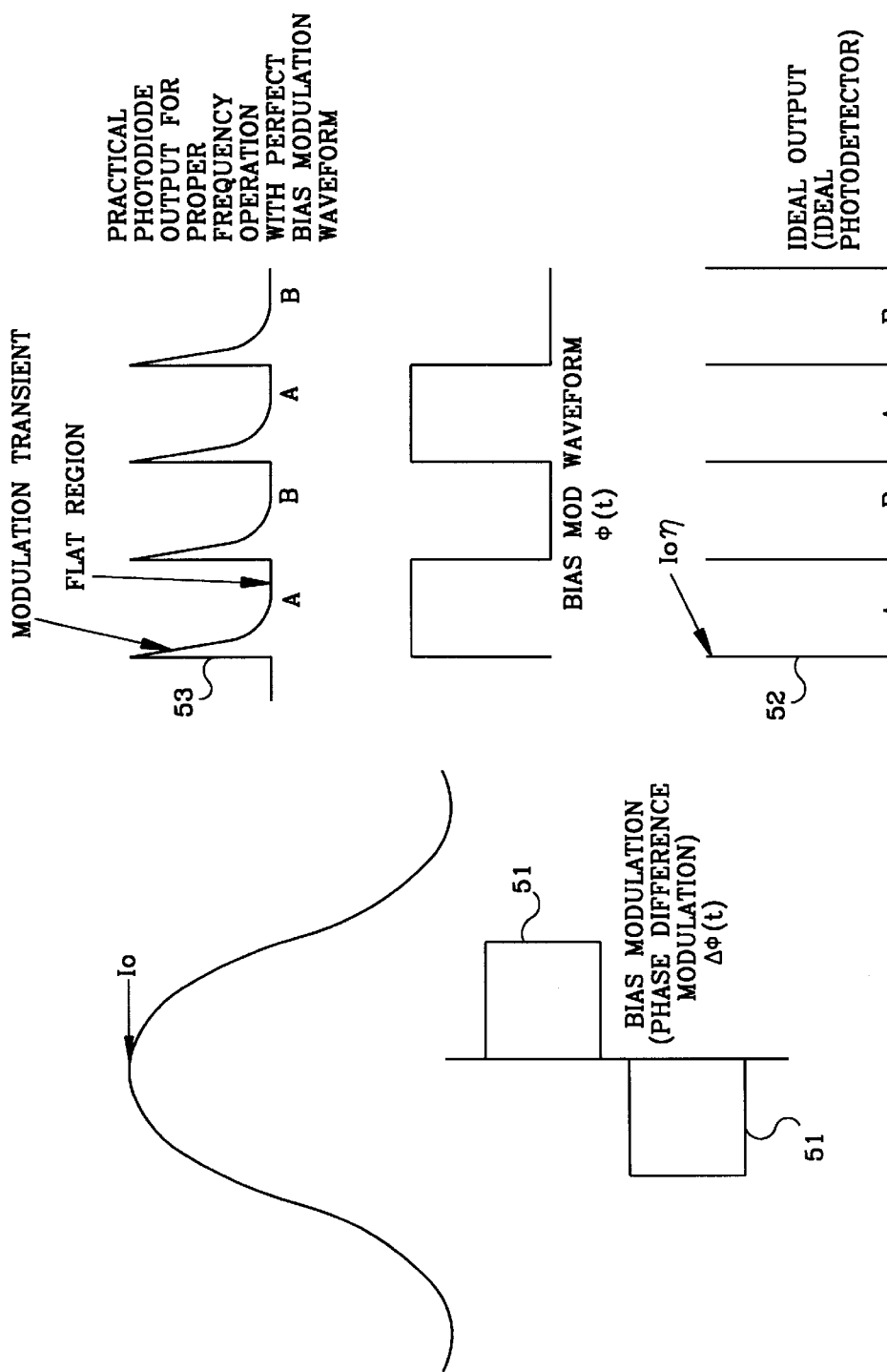
FIGS. 16a and 16b illustrate the various detector outputs for a square wave bias modulation.
Figure 17:
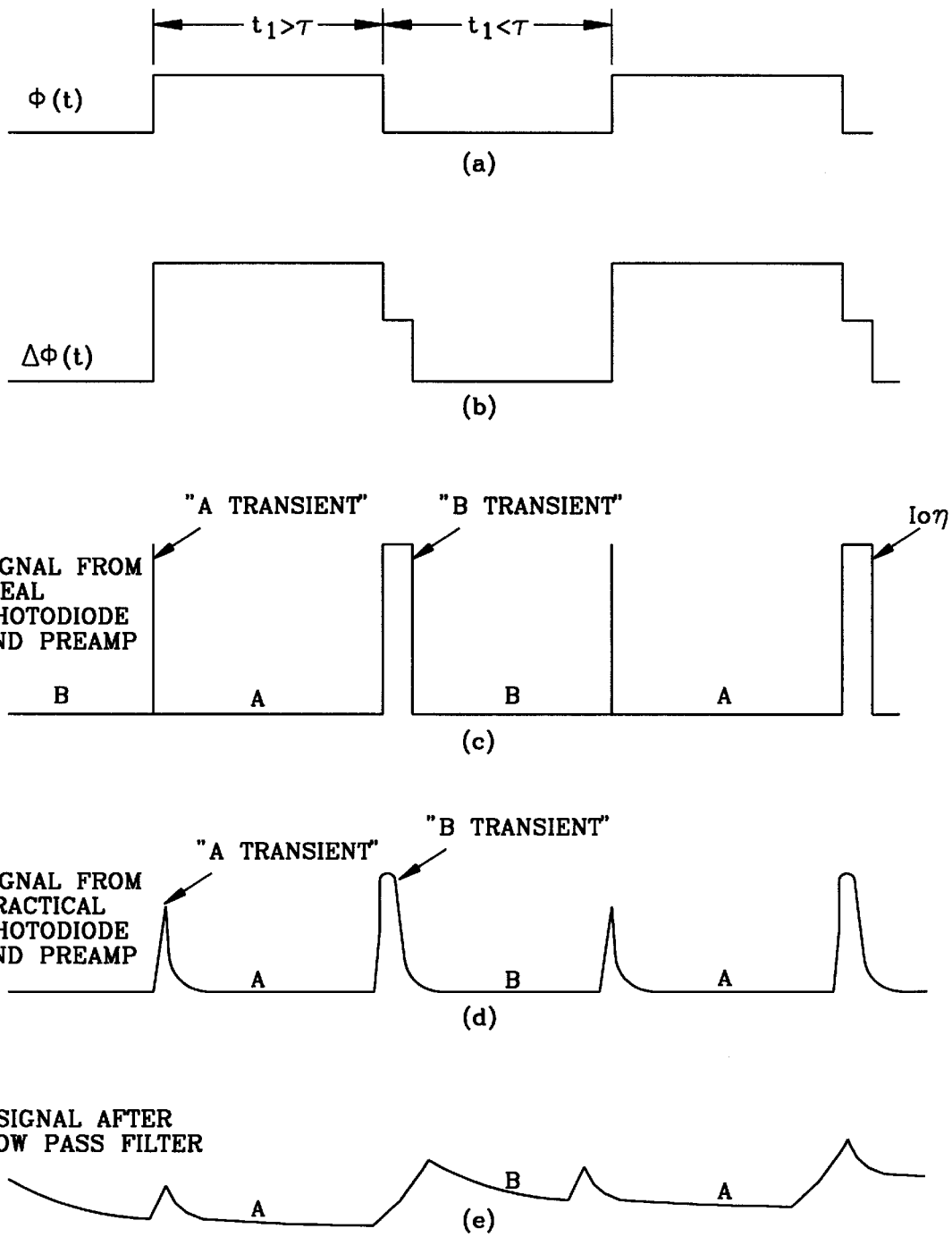
FIG. 17 reveal various signals of an intensity compensated photodetector output scheme.
Figure 19:
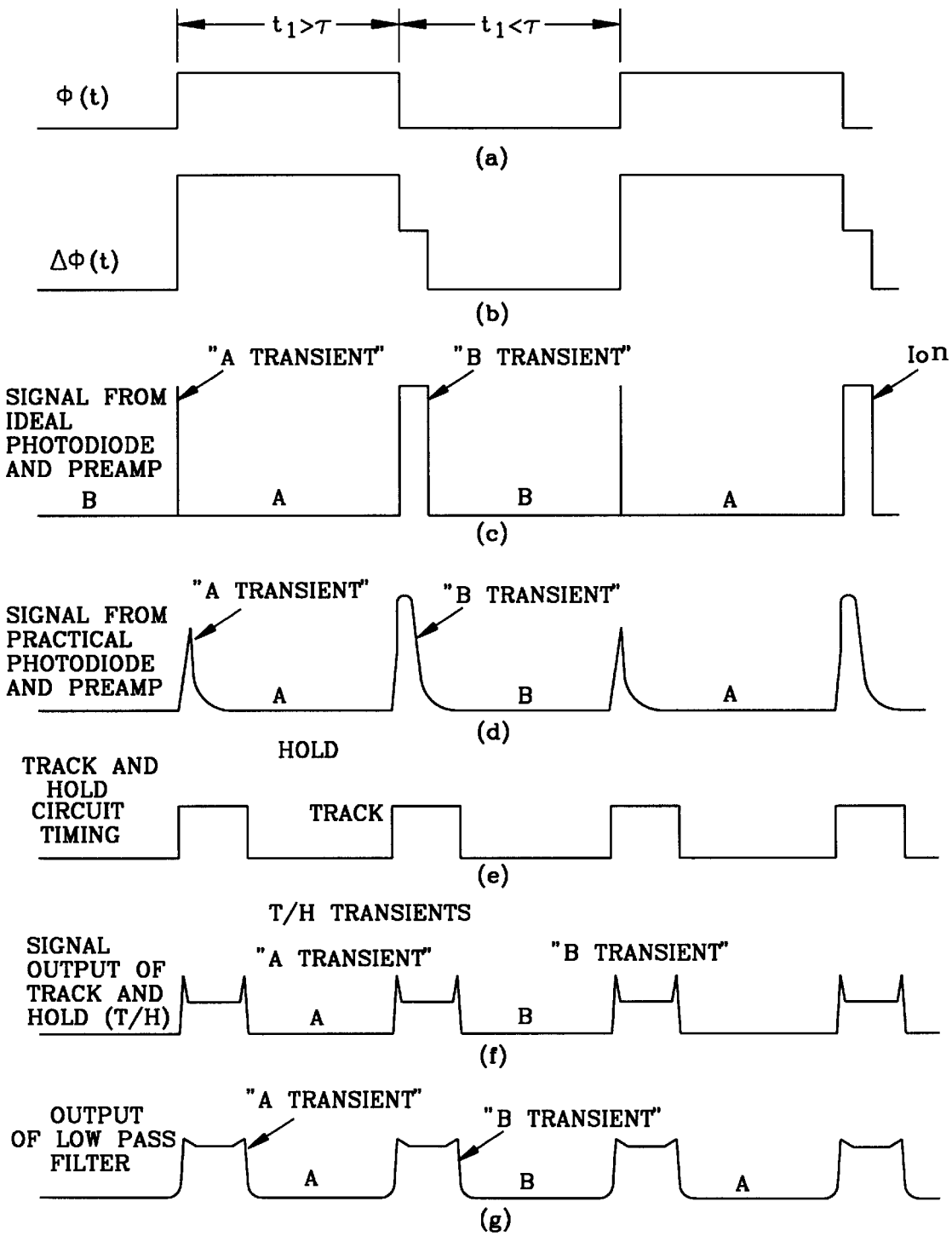
FIG. 19 shows various waveforms of a track and hold intensity compensator.

The error mechanism introduced by the intensity compensator 46 is illustrated in FIGS. 16, 17, and 19 for one example of square wave bias modulation waveform distortion.

Figure 4A:
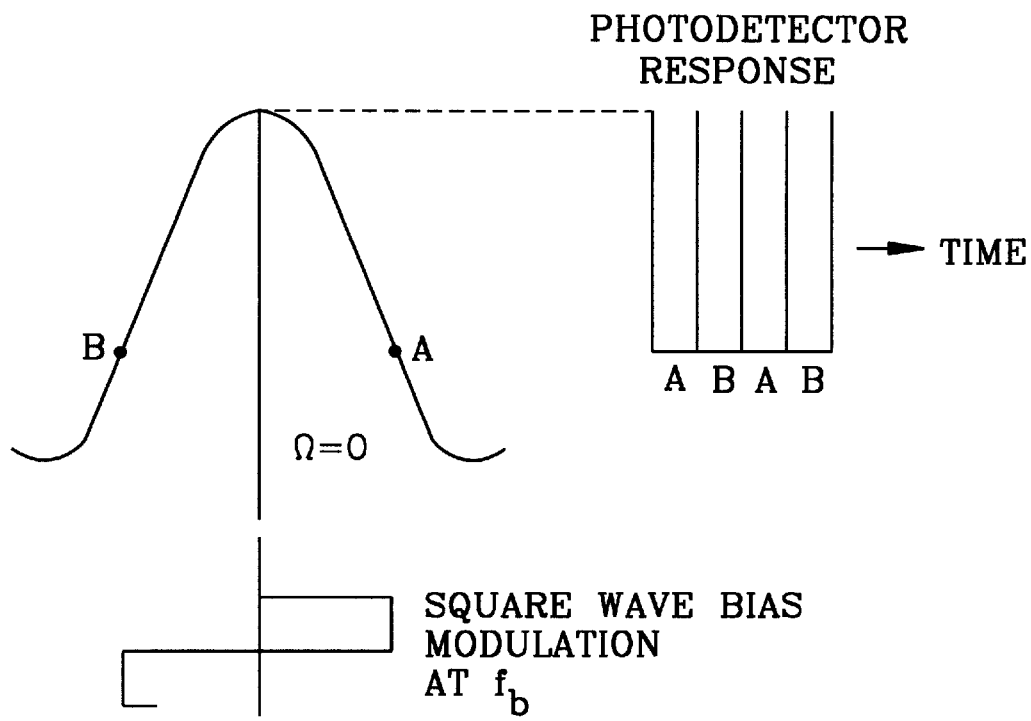
FIGS. 4a and 4b reveal the phase differences of the optical waves and outputs of the gyroscope for zero and non-zero rotation rates, respectively, for square wave modulation.
Figure 4B:
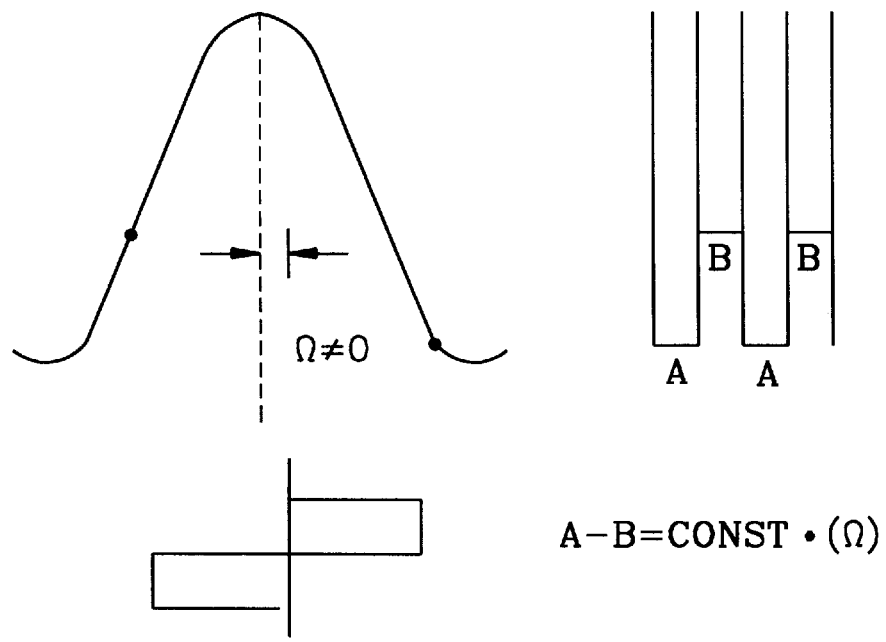
Figure 5A:
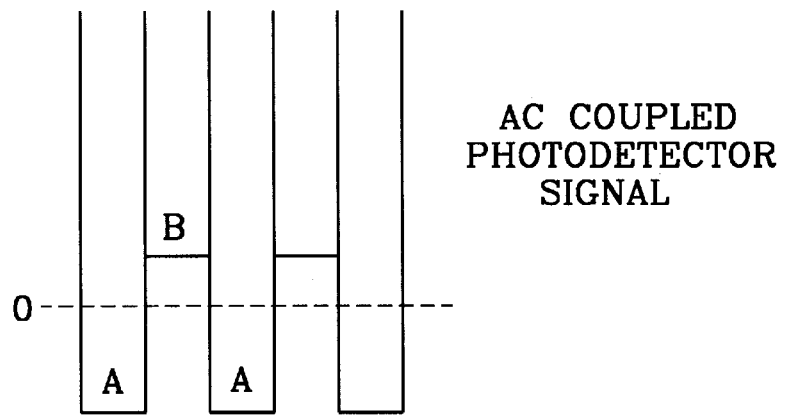
FIGS. 5a, 5b and 5c show signal components synchronous with the bias modulation signal.
Figure 5B:
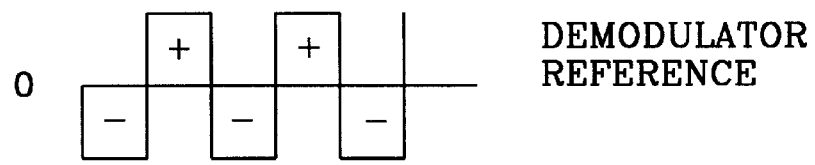
Figure 5C:
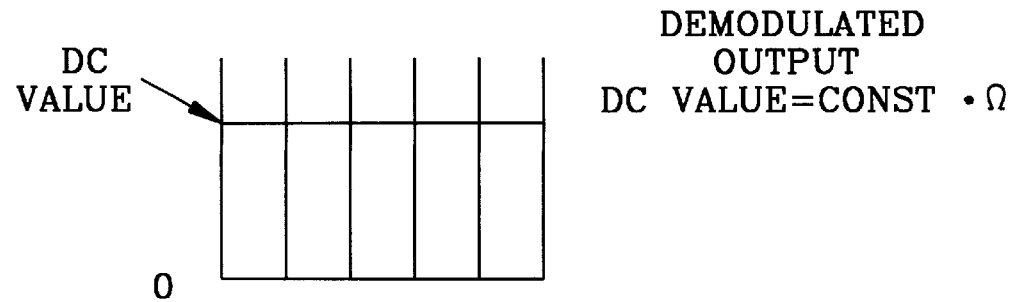
Figure 6:
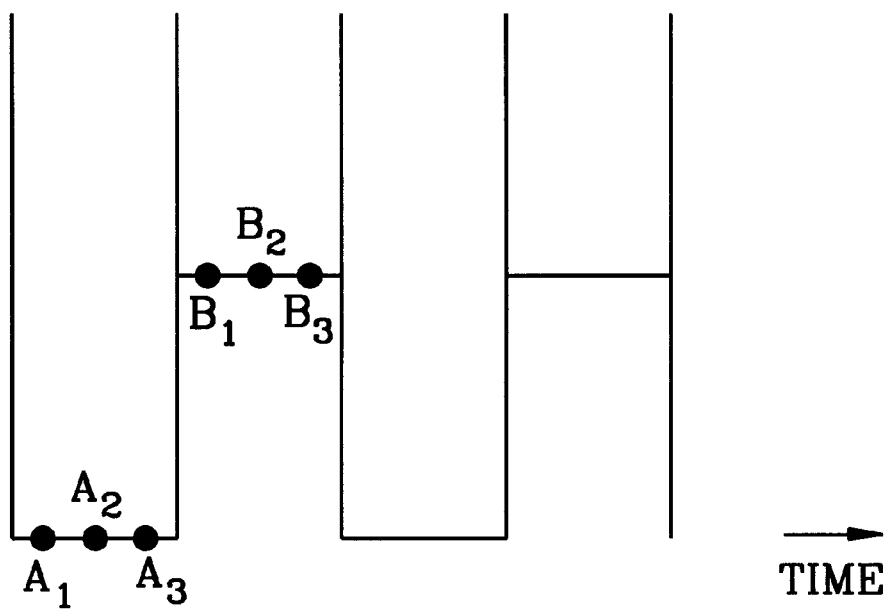
FIG. 6 reveals a sampling scheme for a photodetector output.
Figure 7:
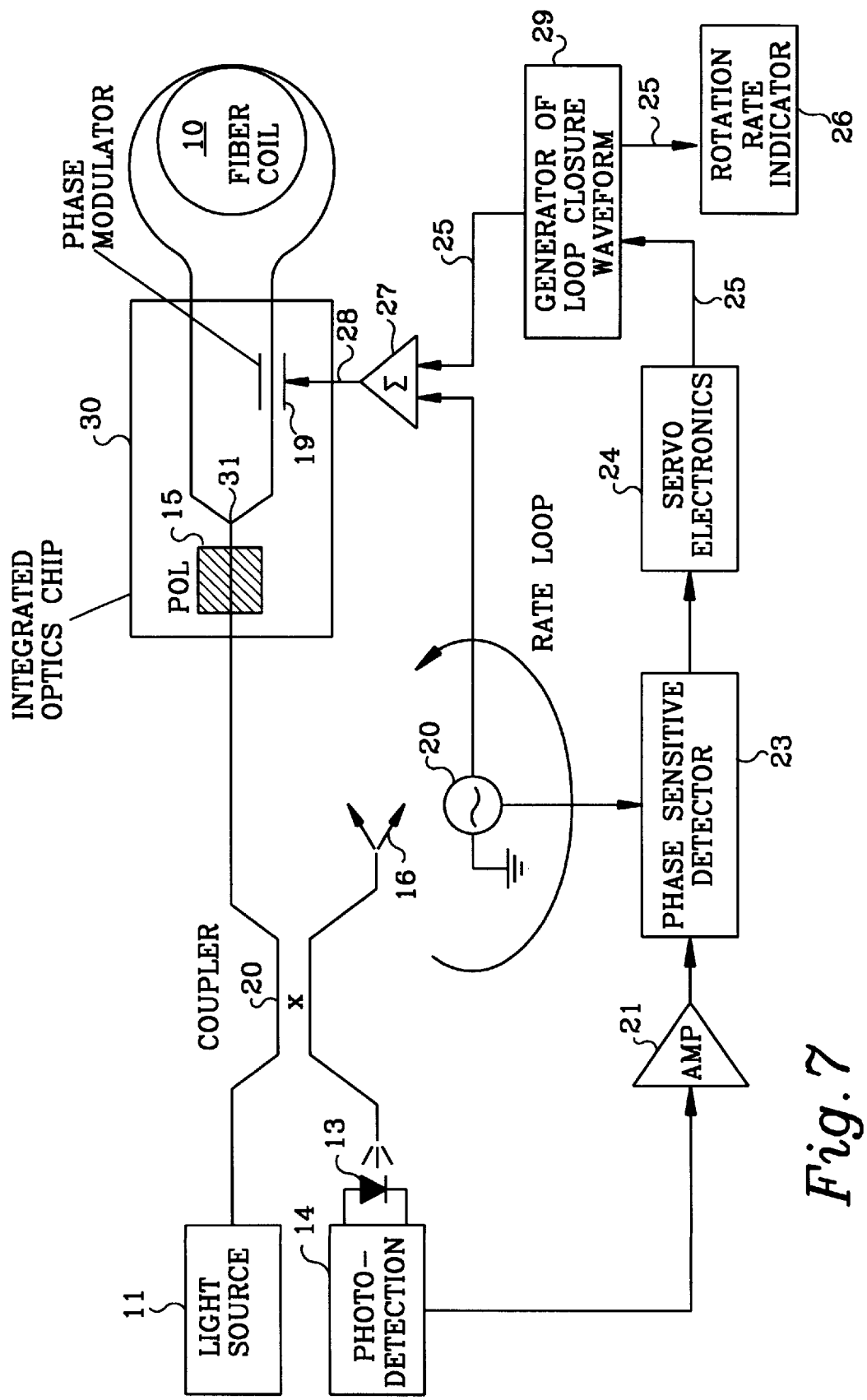
FIG. 7 shows an interferometric fiber optic gyroscope having a rate feedback loop.

FIG. 16 shows the signal pattern out of the photodiode 13 for the case of a perfect square wave bias modulation waveform $\phi(t)$ 20 at the proper frequency $f_p$ 32 $(2\tau)^{-1}$ where $\tau$ is the transit time of light through sensing coil 10. The response of modulator 20 is assumed to be nearly instantaneous. In this case $\Delta\phi(t)$ is the same waveform with twice the amplitude. An output 52 of an ideal photodetector/preamp is shown with a delta function of height $I_o$, for the modulation transient since the photodetector/preamp frequency response is assumed to be quasi-infinite. An output 53 of a practical photodetector/preamp 13, 14 is also depicted. Since it is assumed to have a finite or limited frequency response, it acts as a low pass filter, rising to slightly less than $I_o$ during the modulation transient and decaying with a finite fall time. In principle, for this case the measurement of rotation (either by the method of FIG. 4 or FIG. 5), which relies on measurement of the difference in the output signal for half period A vs. half period B, is uncorrupted. This can be seen in FIG. 17 by noting that even though the modulation transient affects the output signal (for a practical detector) amplitude, it affects the A-half period and the B-half period equally. Since these two half periods are equal, there is no unwanted signal content at $f_b$ in this ideal case.

The above conclusions are not true for the case of an imperfect bias modulation waveform $\phi(t)$ as shown in FIG. 17a. In this case the distortion illustrated is that of a duty cycle that deviates from 50%. The modulation frequency is also detuned from the proper frequency. Thus $\Delta\phi(t)$, shown in FIG. 17b, has noticeable distortion. Even for the case of an ideal photodetector, the output signal (FIG. 17c) does not have a symmetric character for the cases of transitioning from one side of the raised cosine to the other and vice versa. A delta function modulation transient (A-transient) is followed by a flat region for A and then followed by a step (B-transient) with significant area and height $I_o\eta$ before reaching the flat region B. In the practical photodetector case (17d), the latter modulation transient lasts longer, allowing the photodiode-preamp combination to reach a higher maximum during the transient. It also takes longer to decay out of the B-transient than the A-transient. Hence an asymmetry exists that may give rise to unequal average detector signal values for the A-region and the B-region of the bias modulation period, i.e., signal fluctuation at the fundamental frequency $f_b$.

In general, a low pass filter 47 on the photodiode 13 signal prior to demodulation can produce an error if the bias frequency is not precisely equal to the proper frequency. Even though photodetector preamp 14 may be designed to have a very fast response, thus reducing this error, the inclusion of low pass filter 47 in intensity compensator 46 in FIGS. 14 and 15 may ruin this condition. This is further illustrated in FIG. 17e where the photodetector signal is passed through a low pass filter of slower response time than the photodetector/preamp combination. As is shown in FIG. 17e, the A-region and B-region of the signal become very dissimilar. This generates gain variations at $f_b$ in the intensity servo which multiply the output of photodetector 13. A DC average photocurrent may then be amplified by a different gain for one half portion of the bias modulation cycle than the other half period. This produces a signal at the fundamental frequency $f_b$ before the demodulator and gives rise to a false indication of rotation rate.

Figure 18:
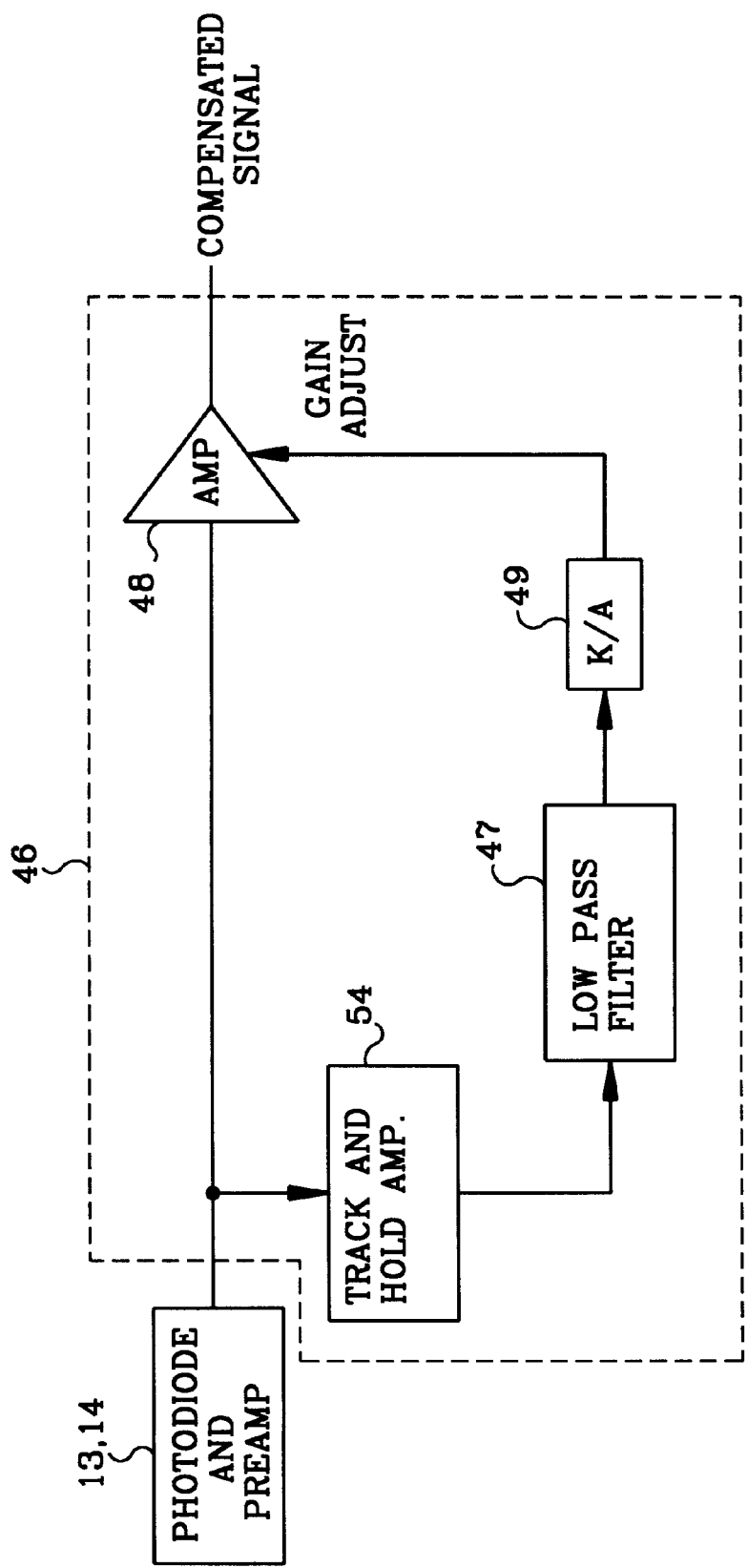
FIG. 18 illustrates a track and hold intensity compensator for a fiber optic gyroscope.

One possible approach to eliminating the imperfections introduced by intensity compensator 46 that are described above is to add a track and hold (T/H) amplifier 54 (see FIG. 18) prior to low pass filter 47. The advantage of T/H amplifier 54 approach is shown in FIG. 19 for the same case as shown in FIG. 17, but with the T/H. The track and hold is used to blank out the modulation transients by holding the photodetector signal during the transient, but tracking it during the flat region. A T/H timing diagram is illustrated in FIG. 19e. The T/H does generate its own transient when it transitions between states, but these transients are identical for the two phases of the bias modulation cycle, i.e. the A-transient and the B-transient are identical as shown in FIG. 19f. Hence if a low pass filter 47 is then applied to the output of T/H circuit 54, as shown in FIG. 19g, there will be no signal content at $f_b$, and therefore intensity compensator 46 will not vary the gain at the bias modulation frequency $f_b$. Hence the signal from photodetector 13 will only be corrected by gain changes at $f_v$, the vibration frequencies of interest. There will no longer be a residual error introduced by intensity compensator 46.

Figure 20:
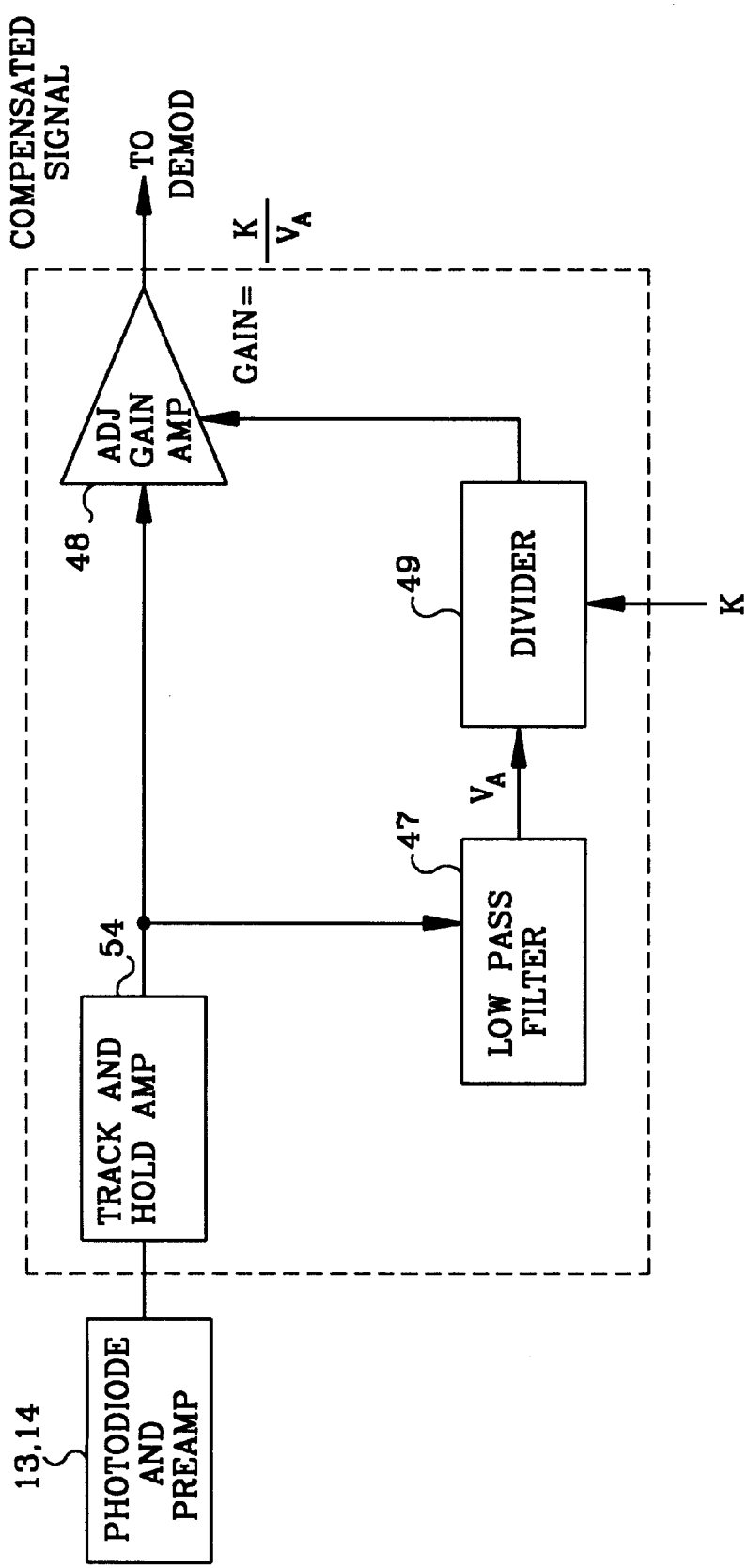
FIG. 20 illustrates another track and hold compensator.

Another implementation that accomplishes this purpose is shown in FIG. 20. Again, it uses a track and hold circuit 54 to symmetrize the modulation transient signal pattern, this time for both the main-gyro signal path and intensity compensator 46 gain adjustment.

One last method of reducing vibration rectification errors is to increase the bandwidth of the primary rate servo so as to counteract the vibration induced phase shift δ at frequency $f_v$. In the prior art treatments, the primary purpose of the rate servo was to provide a feedback phase shift $\phi_f$ equal and opposite to that of the rotation rate to be measured. This is reflected in equation 10. Since the rotation rates of interest change slowly, typically at rates of less than 100 Hz, the necessary conventional rate loop bandwidth is at most a few hundred Hz.

However, by expanding the loop bandwidth to have considerable gain up to frequencies beyond that of the expected vibration spectrum, one may attenuate the net phase shift at $f_v$, and therefore attenuate the DC error of equation 16. That is, equation 13 would be modified for a closed loop system to give $$i = \frac{1}{2} I_o \eta (1 + \cos[\phi_b \cos \omega_b t + (\delta + \phi_R + \phi_f)]) \quad (26)$$

for the case of sinusoidal modulation. It is possible to construct a rate servo that has sufficiently high bandwidth so that the phase shift $\phi_f$ will not only contain a low frequency component $\phi_{fo}$ that is equal and opposite to $\phi_R$, but also a high frequency component $\Delta\phi_f$ at the frequency $f_v$. This latter term will produce an oppositely directed phase shift to that of the vibration induced phase modulation at $f_v$. Thus, the photodetector current may be represented as, $$i = \frac{1}{2} I_o \eta (1 + \cos[\phi_b \cos \omega_b t + [\Delta\phi_v \cos(\omega_v t + \varepsilon) + \Delta\phi_f \cos(\omega_v t + \beta)] + \phi_R + \phi_{fo}]) \quad (27)$$

where β represents a phase angle of the feedback signal of $f_v$. The net optical phase shift $\Delta\phi_{nv}$ at $f_v$ is a combination of two terms shown in eqn 27, $$\Delta\phi_{nv} = \Delta\phi_v \cos(\phi_v t + \varepsilon) + \Delta\phi_f \cos(\omega_i + \beta) \quad (28)$$

As the bandwidth of the rate loop is increased, $\Delta\phi_f$ approaches a value of $\Delta\phi_v$ and β approaches ε+π. Hence, the net phase difference modulation $\Delta\phi_{nv}$ at $f_v$ approaches zero. By substituting $\Delta\phi_{nv}$ for $\Delta\phi_v$ in eqn 16, one can see that the rectification term vanishes as $\Delta\phi_{nv} \to 0$.

Thus, in this invention, another method of eliminating or reducing vibration rectification errors is to greatly increase the bandwidth of the rate feedback loop, well beyond that needed for rotation sensing, to beyond the expected vibration spectrum. This technique may be used in combination with all intensity servo and intensity compensator arrangements discussed previously. Similarly, it may be used with square wave modulation schemes. Finally, it must be noted that for simplicity, the above discussion focused on sinusoidal vibration inputs. In reality, a real environment contains a superposition of sinusoidal vibration inputs, known as a random or more precisely a pseudo-random vibration spectrum. In this case, the cumulative rectified error is a combination of error contributions from arising from vibration at various frequencies. Each error contribution is a result of intensity modulation and a non-zero net optical phase shift at a specific frequency in the spectrum. The techniques discussed in this invention disclosure for eliminating rectification at single frequencies also apply simultaneously to a spectrum of frequencies, i.e., to a random vibration input.

We claim:

1. A vibration rectification error reducer for a fiber optic gyroscope, comprising:

a light source;

a photodetector;

a first splitter/combiner having a first waveguide connected to said light source, a second waveguide connected to said photodetector, and a third waveguide;

a second splitter/combiner having a first waveguide connected to said first splitter/combiner, and having second and third waveguides;

a sensing coil connected to the second and third waveguides of said second splitter/combiner;

an amplifier connected to said photodetector; and an amplifier gain controller, for controlling a gain of said amplifier, connected to said photodetector and to said amplifier.

2. The vibration rectification error reducer for a fiber optic gyroscope of claim 1, further comprising a filter connected between said photodetector and said amplifier gain controller.

3. The vibration rectification error reducer for a fiber optic gyroscope of claim 2, wherein said filter filters out some signals that represent information indicating a measurement of a rate of rotation of said sensing coil.

4. The vibration rectification error reducer for a fiber optic gyroscope of claim 2, wherein said filter is a low-pass filter.

5. The vibration rectification error reducer for a fiber optic gyroscope of claim 4, further comprising:

a phase sensitive demodulator connected to said amplifier;

a rate loop servo connected to said phase sensitive demodulator;

a modulator situated in an optical path of said sensing coil and said second splitter/combiner, and connected to said rate loop;

a modulation signal generator connected to said phase sensitive demodulator and said modulator and wherein said rate loop servo has an expanded bandwidth so as to significantly attenuate signals in a vibration frequency range.

6. The vibration rectification error reducer for a fiber optic gyroscope of claim 5, further comprising a polarizer situated proximate to or in said second splitter/combiner.

7. A vibration rectification error reducer for a fiber optic gyroscope, comprising:

a light source;

a photodetector;

a first splitter/combiner having a first waveguide connected to said light source, a second waveguide connected to said photodetector, and a third waveguide;

a polarizer connected to the third waveguide of said first splitter/combiner;

a second splitter/combiner having a first waveguide connected to said polarizer, and having second and third waveguides;

a sensing coil having first and second ends connected to the second and third waveguides, respectively, of said second splitter/combiner;

a track and hold amplifier connected to said photodetector;

an adjustable gain amplifier connected to said photodetector; and an amplifier gain controller connected to said track and hold amplifier and to said adjustable gain amplifier.

8. The vibration rectification error reducer for a fiber optic gyroscope of claim 7, further comprising a filter connected between said track and hold amplifier and said amplifier gain controller.

9. The vibration rectification error reducer for a fiber optic gyroscope of claim 8, wherein said filter filters out some signals that represent information indicating a measurement of a rate of rotation of said sensing coil.

10. The vibration rectification error reducer for a fiber optic gyroscope of claim 8, wherein said filter is a low pass filter.

11. The vibration rectification error reducer for a fiber optic gyroscope of claim 10, further comprising:
    a phase sensitive demodulator connected to said amplifier;
    a rate loop servo connected to said phase sensitive demodulator;
    a modulator situated in an optical path of said sensing coil and said second splitter/combiner, and connected to said rate loop;
    a modulation signal generator connected to said phase sensitive demodulator and said modulator and
    wherein said rate loop servo has an expanded bandwidth so as to significantly attenuate signals in a vibration frequency range.

12. The vibration rectification error reducer for a fiber optic gyroscope of claim 11, further comprising a polarizer situated proximate to or in said second splitter/combiner.

13. A vibration rectification error reducer for a fiber optic gyroscope, comprising:
    a light source;
    a photodetector;
    a first splitter/combiner having a first waveguide connected to said light source, a second waveguide connected to said photodetector, and a third waveguide;
    a second splitter/combiner having a first waveguide connected to said first splitter/combiner, and having second and third waveguides;
    a sensing coil having first and second ends connected to the second and third waveguides, respectively, of said second splitter/combiner;
    a track and hold amplifier connected to said photodetector;
    an adjustable gain amplifier connected to said track and hold amplifier; and
    an amplifier gain controller connected to said track and hold amplifier and to said adjustable gain amplifier.

14. The vibration rectification error reducer for a fiber optic gyroscope of claim 13, further comprising a filter connected between said track and hold amplifier and said amplifier gain controller.

15. The vibration rectification error reducer for a fiber optic gyroscope of claim 14, wherein said filter filters out some signals that represent information indicating a measurement of a rate of rotation of said sensing coil.

16. The vibration rectification error reducer for a fiber optic gyroscope of claim 14, wherein said filter is a low pass filter.

17. The vibration rectification error reducer for a fiber optic gyroscope of claim 16, further comprising:
    a phase sensitive demodulator connected to said amplifier;
    a rate loop servo connected to said phase sensitive demodulator;
    a modulator situated in an optical path of said sensing coil and said second splitter/combiner, and connected to said rate loop;
    a modulation signal generator connected to said phase sensitive demodulator and said modulator and
    wherein said rate loop servo has an expanded bandwidth so as to significantly attenuate signals in a vibration frequency range.

18. The vibration rectification error reducer for a fiber optic gyroscope of claim 17, further comprising a polarizer situated proximate to or in said second splitter/combiner.

19. A vibration rectification error reducer for a multiple fiber optic gyroscope unit, comprising:
    a light source;
    a multiple-way splitter having an input waveguide connected to said light source, and having a plurality of output waveguides;
    a plurality of fiber optic gyroscopes wherein each gyroscope is connected to an output waveguide, respectively, of said plurality of waveguides; and
    wherein each fiber optic gyroscope comprises:
        a photodetector;
        a first splitter/combiner having a first waveguide connected to an output waveguide of said plurality of waveguides, a second waveguide connected to said photodetector, and a third waveguide;
        a second splitter/combiner having a first waveguide connected to the third waveguide of said first splitter/combiner, and having second and third waveguides;
        a sensing coil having first and second ends connected to the second and third waveguides, respectively, of said second splitter/combiner;
        an amplifier connected to said photodetector; and
        an amplifier gain controller, for controlling a gain of said amplifier, connected to said photodetector and to said amplifier.

20. The vibration rectification error reducer for a multiple fiber optic gyroscope unit of claim 19, wherein said each fiber optic gyroscope further comprises a filter connected between said photodetector and said amplifier gain controller.

21. The vibration rectification error reducer for a multiple fiber optic gyroscope unit of claim 20, wherein said filter filters out some signals that represent information indicating a measurement of a rate of rotation of said sensing coil.

22. The vibration rectification error reducer for a multiple fiber optic gyroscope unit of claim 20, wherein said filter is a low-pass filter.

23. The vibration rectification error reducer for a multiple fiber optic gyroscope unit of claim 22, wherein said each fiber optic gyroscope further comprises:
    a phase sensitive demodulator connected to said amplifier;
    a rate loop servo connected to said phase sensitive demodulator;
    a modulator situated in an optical path of said sensing coil and said second splitter/combiner, and connected to said rate loop;
    a modulation signal generator connected to said phase sensitive demodulator and said modulator and
    wherein said rate loop servo has an expanded bandwidth so as to significantly attenuate signals in a vibration frequency range.

24. The vibration rectification error reducer for a multiple fiber optic gyroscope unit of claim 23, wherein said each fiber optic gyroscope further comprises a polarizer situated proximate to or in said second splitter/combiner.

25. A vibration rectification error reducer for a multiple fiber optic gyroscope unit, comprising:
    a light source;
    a multiple-way splitter having a input waveguide connected to said light source, and having a plurality of output waveguides;
    a plurality of fiber optic gyroscopes wherein each gyroscope is connected to an output waveguide, respectively, of said plurality of waveguides; and wherein each fiber optic gyroscope comprises:
- a photodetector;
- a first splitter/combiner having a first waveguide connected to an output waveguide of said plurality of waveguides, a second waveguide connected to said photodetector, and a third waveguide;
- a second splitter/combiner having a first waveguide connected to the third waveguide of said first splitter/combiner, and having second and third waveguides;
- a sensing coil having first and second ends connected to the second and third waveguides, respectively, of said second splitter/combiner;
- a track and hold amplifier connected to said photodetector;
- an adjustable gain amplifier connected to said photodetector; and
- an amplifier gain controller connected to said track and hold amplifier and to said adjustable gain amplifier.

26. The vibration rectification error reducer for a multiple fiber optic gyroscope unit of claim 25, wherein said each fiber optic gyroscope further comprises a filter connected between said track and hold amplifier and said amplifier gain controller.

27. The vibration rectification error reducer for a multiple fiber optic gyroscope unit of claim 26, wherein said filter filters out some signals that represent information indicating a measurement of a rate of rotation of said sensing coil.

28. The vibration rectification error reducer for a multiple fiber optic gyroscope of claim 26, wherein said filter is a low pass filter.

29. The vibration rectification error reducer for a multiple fiber optic gyroscope unit of claim 28, wherein said each fiber optic gyroscope further comprises:
- a phase sensitive demodulator connected to said amplifier;
- a rate loop servo connected to said phase sensitive demodulator;
- a modulator situated in an optical path of said sensing coil and said second splitter/combiner, and connected to said rate loop;
- a modulation signal generator connected to said phase sensitive demodulator and said modulator and
- wherein said rate loop servo has an expanded bandwidth so as to significantly attenuate signals in a vibration frequency range.

30. The vibration rectification error reducer for a multiple fiber optic gyroscope unit of claim 29, wherein said each fiber optic gyroscope further comprises a polarizer situated proximate to or in said second splitter/combiner.

31. A vibration rectification error reducer for a multiple fiber optic gyroscope unit, comprising:
- a light source;
- a multiple-way splitter having a input waveguide connected to said light source, and having a plurality of output waveguides;
- a plurality of fiber optic gyroscopes wherein each gyroscope is connected to an output waveguide, respectively, of said plurality of waveguides; and wherein each fiber optic gyroscope comprises:
- a photodetector;
- a first splitter/combiner having a first waveguide connected to an output waveguide of said plurality of waveguides, a second waveguide connected to said photodetector, and a third waveguide;
- a second splitter/combiner having a first waveguide connected to the third waveguide of said first splitter/combiner, and having second and third waveguides;
- a sensing coil having first and second ends connected to the second and third waveguides, respectively, of said second splitter/combiner;
- a track and hold amplifier connected to said photodetector;
- an adjustable gain amplifier connected to said track and hold amplifier; and
- an amplifier gain controller connected to said track and hold amplifier and to said adjustable gain amplifier.

32. The vibration rectification error reducer for a multiple fiber optic gyroscope unit of claim 31, wherein each said fiber optic gyroscope further comprises a filter connected between said track and hold amplifier and said amplifier gain controller.

33. The vibration rectification error reducer for a multiple fiber optic gyroscope unit of claim 32, wherein said filter filters out some signals that represent information indicating a measurement of a rate of rotation of said sensing coil.

34. The vibration rectification error reducer for a multiple fiber optic gyroscope unit of claim 32, wherein said filter is a low pass filter.

35. The vibration rectification error reducer for a multiple fiber optic gyroscope unit of claim 34, wherein each said fiber optic gyroscope further comprises:
- a phase sensitive demodulator connected to said amplifier;
- a rate loop servo connected to said phase sensitive demodulator;
- a modulator situated in an optical path of said sensing coil and said second splitter/combiner, and connected to said rate loop;
- a modulation signal generator connected to said phase sensitive demodulator and said modulator and
- wherein said rate loop servo has an expanded bandwidth so as to significantly attenuate signals in a vibration frequency range.

36. The vibration rectification error reducer for a multiple fiber optic gyroscope unit of claim 35, wherein each sad fiber optic gyroscope further comprises a polarizer situated proximate to or in said second splitter/combiner.

* * * * *